(12) United States Patent
Isu et al.

(10) Patent No.: US 7,469,009 B2
(45) Date of Patent: Dec. 23, 2008

(54) IMAGE DECODING APPARATUS, IMAGE CODING APPARATUS, IMAGE COMMUNICATIONS SYSTEM AND CODED BIT STREAM CONVERTING APPARATUS

(75) Inventors: Yoshimi Isu, Tokyo (JP); Shunichi Sekiguchi, Tokyo (JP); Kohtaro Asai, Tokyo (JP); Hirofumi Nishikawa, Tokyo (JP); Shinichi Kuroda, Tokyo (JP); Yuri Hasegawa, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 821 days.

(21) Appl. No.: 11/016,889

(22) Filed: Dec. 21, 2004

(65) Prior Publication Data

US 2005/0141610 A1 Jun. 30, 2005

Related U.S. Application Data

(62) Division of application No. 09/529,304, filed as application No. PCT/JP97/03846 on Oct. 23, 1997, now Pat. No. 6,862,320.

(51) Int. Cl.
*H04B 1/66* (2006.01)
(52) U.S. Cl. .................................. 375/240.12
(58) Field of Classification Search ............ 375/240.12, 375/240.24, 240.26, 240.16, 240.17; *H04B 1/66*
See application file for complete search history.

(56) References Cited

U.S. PATENT DOCUMENTS

| | | | |
|---|---|---|---|
| 5,361,096 A | 11/1994 | Ohki et al. | |
| 5,544,266 A | 8/1996 | Koppelmans et al. | |
| 5,566,089 A | 10/1996 | Hoogenboom | |
| 5,629,736 A | 5/1997 | Haskell et al. | |
| 5,686,965 A | 11/1997 | Auld | |
| 5,764,658 A | 6/1998 | Sekiguchi et al. | |
| 5,825,430 A | 10/1998 | Adolph et al. | |
| 5,828,425 A | 10/1998 | Kim | |
| 5,898,695 A | 4/1999 | Fujii et al. | |
| 5,915,043 A | 6/1999 | Ueda | |

(Continued)

FOREIGN PATENT DOCUMENTS

CN 348921 12/1998

(Continued)

OTHER PUBLICATIONS

ISO/IEC 13818-2: 1995(E); Recommendation ITU-T H.262 (1995 E); pp. 82-86.

(Continued)

*Primary Examiner*—Tung Vo
(74) *Attorney, Agent, or Firm*—Birch, Stewart, Kolasch & Birch, LLP

(57) ABSTRACT

An image decoding apparatus is capable of decoding coded bit streams with different coding schemes. The image decoding apparatus includes a coding scheme decision section for deciding a coding scheme from coding scheme identification information multiplexed into a coded bit stream, a setting unit for setting header information on a second coding scheme in accordance with header information in a first coding scheme, and a decoder for decoding image coded data in the first coding scheme in response to the header information on the second coding scheme, which is set.

2 Claims, 17 Drawing Sheets

U.S. PATENT DOCUMENTS

| | | | |
|---|---|---|---|
| 5,937,138 A | | 8/1999 | Fukuda et al. |
| 6,002,803 A | | 12/1999 | Qian et al. |
| 6,028,639 A | * | 2/2000 | Bhatt et al. ............... 348/441 |
| 6,466,697 B1 | | 10/2002 | Boon |
| 6,765,966 B2 | * | 7/2004 | Vince ............... 375/240.26 |
| 6,768,775 B1 | * | 7/2004 | Wen et al. ............. 375/240.23 |
| 6,925,501 B2 | * | 8/2005 | Wang et al. ............... 709/231 |
| 6,999,512 B2 | * | 2/2006 | Yoo et al. ............. 375/240.03 |
| 2001/0038649 A1 | | 11/2001 | Hagai et al. |
| 2001/0055322 A1 | | 12/2001 | Domon |
| 2002/0054640 A1 | | 5/2002 | Boon |

FOREIGN PATENT DOCUMENTS

| | | |
|---|---|---|
| JP | 6-125539 A | 5/1994 |
| JP | 7-30763 A | 1/1995 |
| JP | 7-143475 A | 6/1995 |
| JP | 8-79758 A | 3/1996 |
| JP | 8-268655 A | 11/1996 |
| JP | 9-121166 A | 5/1997 |
| JP | 9-139937 A | 6/1997 |

OTHER PUBLICATIONS

Kogure et al., Nikkei Electronics, No. 699, pp. 159-160 (1997).

Thomas Sikora, "The MPEG-4 Video Standard Verification Model" IEEE Transactions on Circuits and Systems for Video Technology, vol. 7, No. 1, Feb. 1997, pp. 19-31.

P.N. Tudor and O.H. Werner, "*Real-Time Transcoding of MPEG-2 Video Bit Streams*," International Broadcasting Convention (No. 447, Sep. 12-16, 1997).

* cited by examiner

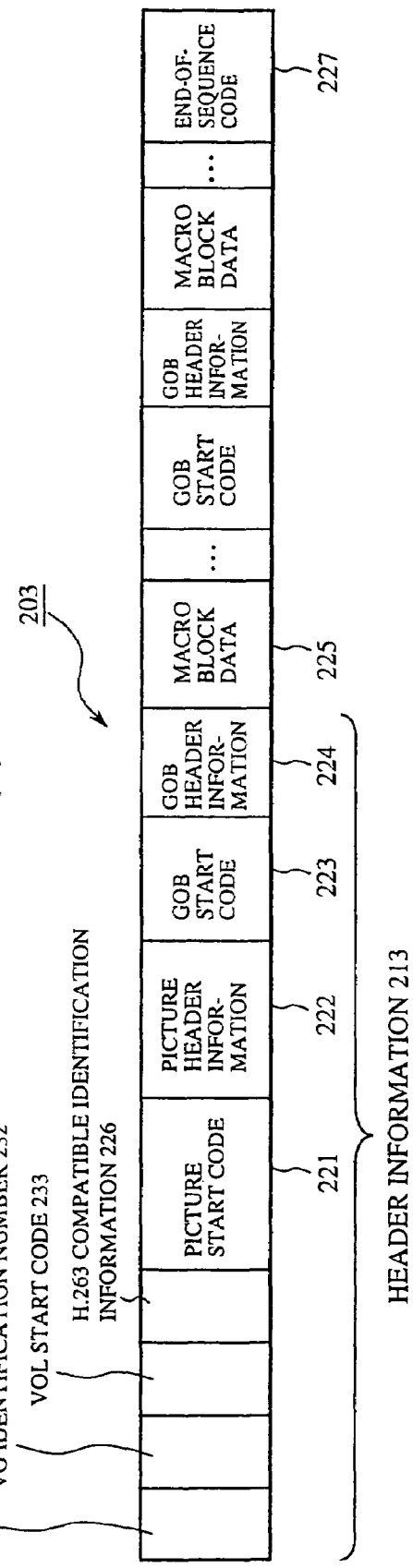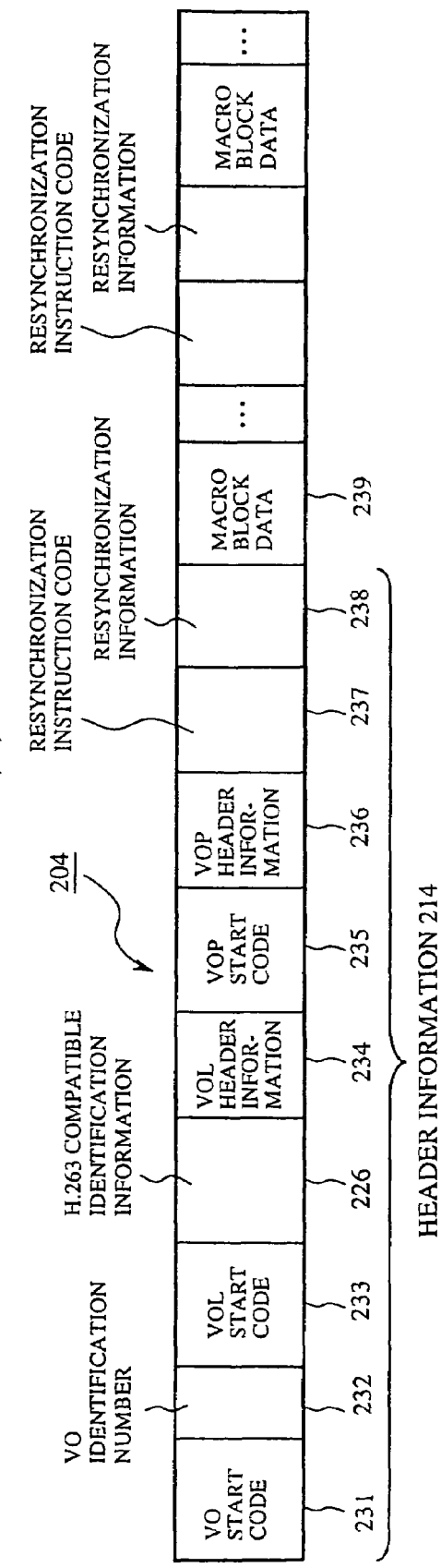

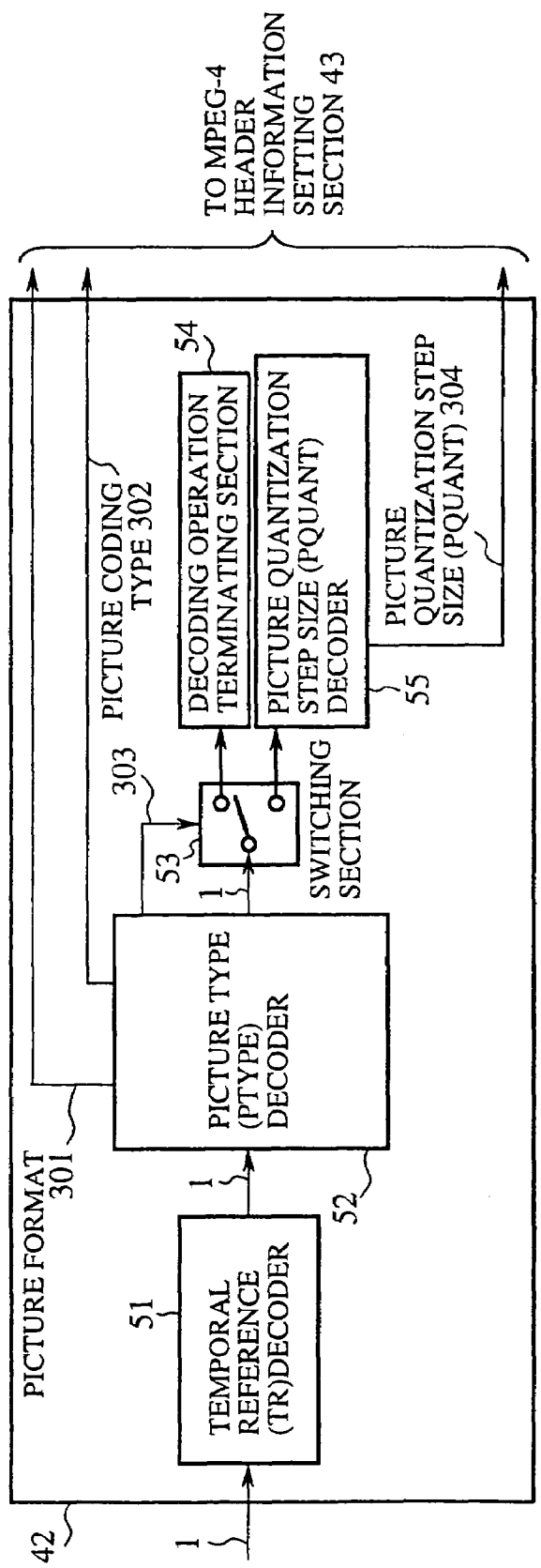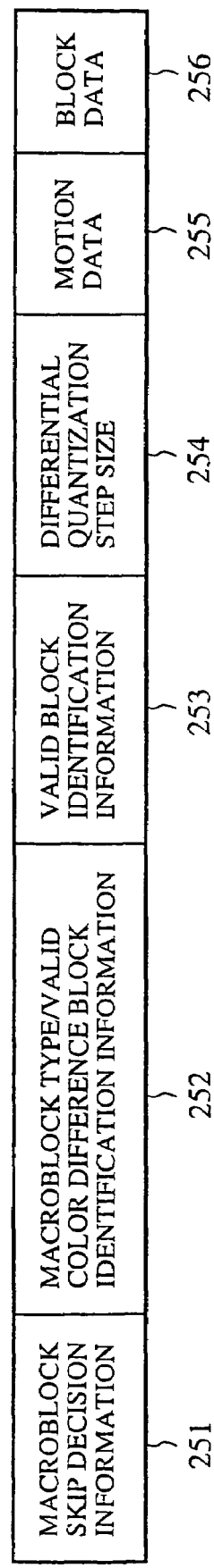

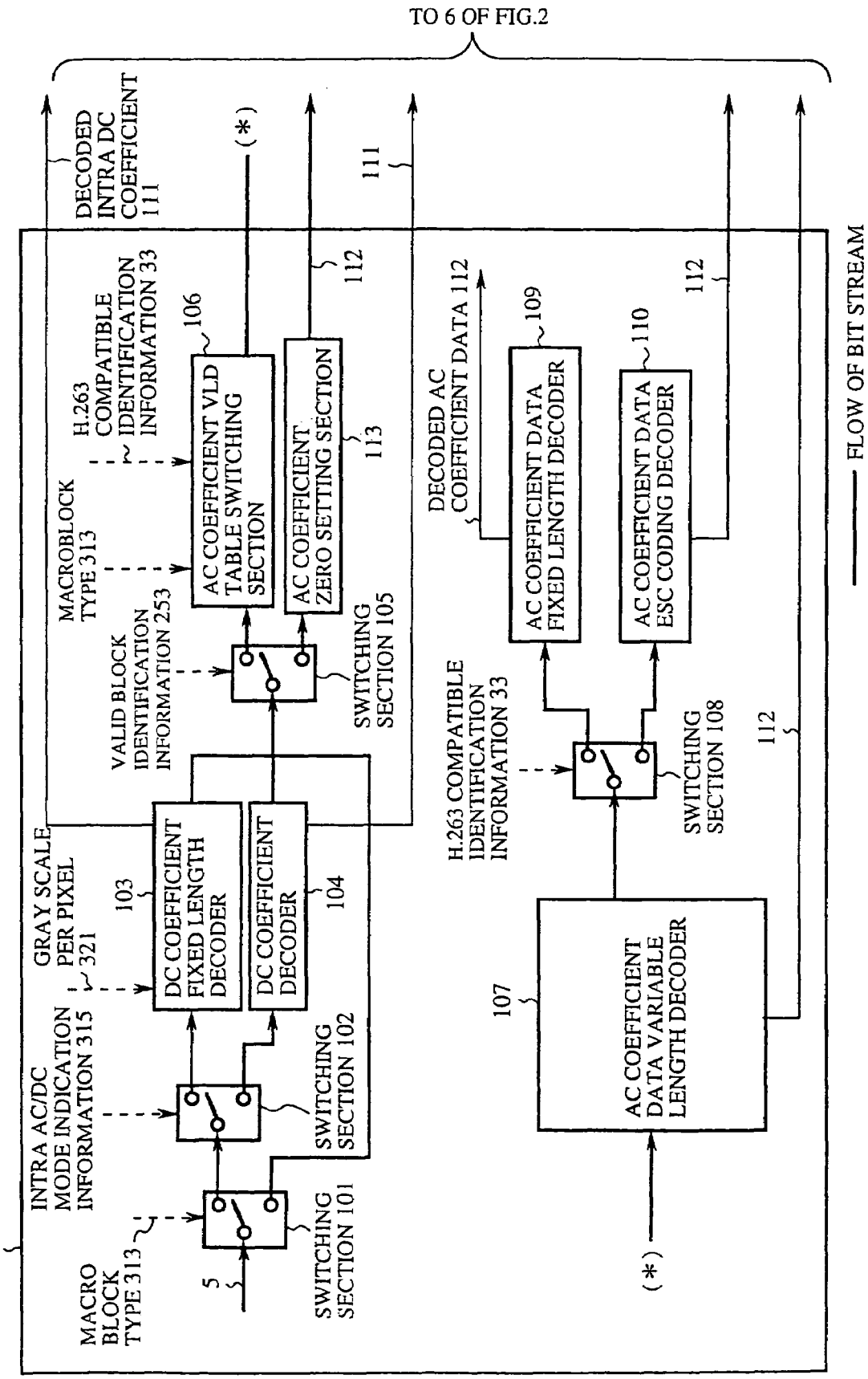

------- VOP BOUNDARY (GOB BOUNDARY WHEN DETECTING GOB HEADER)

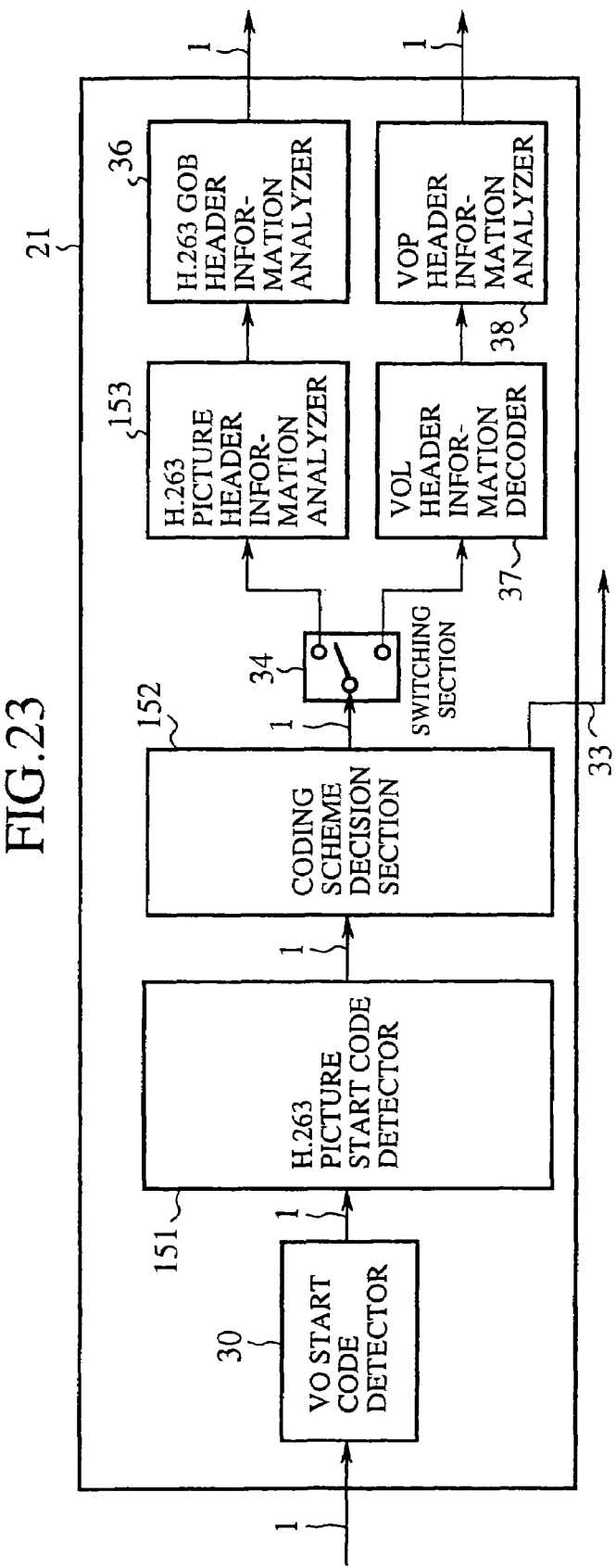

IMAGE DECODING APPARATUS, IMAGE CODING APPARATUS, IMAGE COMMUNICATIONS SYSTEM AND CODED BIT STREAM CONVERTING APPARATUS

This patent application is a divisional application of U.S. patent application Ser. No. 09/529,304 filed on Apr. 12, 2000, now U.S. Pat. No. 6,862,320 which is the national phase under 35 U.S.C. § 371 of PCT International Application No. PCT/JP97/03846 which has an International filing date of Oct. 23, 1997, which designated the United States of America.

TECHNICAL FIELD

The present invention relates to an image decoding apparatus, an image coding apparatus, an image communications system and a coded bit stream converting apparatus, all of which can handle coded bit streams with different coding schemes.

BACKGROUND ART

A system based on the MPEG-4 (Moving Picture Experts Group Phase-4) which is currently in progress toward standardization in ISO/IEC JTC11/SC29/WG11 differs from a system based on ITU-T Recommendation H.263 in header information (an information signal for decoding) to be added to a coded bit stream which constitutes a transmitted signal.

FIG. 1(a) is a diagram showing a structure of an H.263 coded bit stream 201 based on the H.263 standard, into which header information 211 is multiplexed along with macroblock data 225 consisting of image coded data encoded according to the H.263 coding scheme. FIG. 1(b) is a diagram showing a structure of an MPEG-4 coded bit stream 202, into which header information 212 is multiplexed along with macroblock data 239 consisting of image coded data encoded according to the MPEG-4 coding scheme. As shown in these figures, they have different coded bit stream structures. In particular, the H.263 does not include header information about VO (Video Object), VOL (Video Object Layer), VOP (Video Object Plane) and the like, which are required for MPEG-4 decoding. Accordingly, to carry out the image communications based on the two schemes, separate image decoding apparatuses and image coding apparatuses are needed.

Here, it is not always necessary for a GOB start code 223 and GOB header information 224 in the H.263 coded bit stream 201, and resynchronization instruction code 237 and resynchronization information 238 in the MPEG-4 coded bit stream 202 to be inserted, but inserted as needed.

With such structures, the conventional coded bit streams present a problem in that an MPEG-4 compatible image decoding apparatus, for example, cannot decode the H.263 coded bit stream 201 generated according to the H.263 standard.

Furthermore, to decode the coded bit streams according to the MPEG-4 and H.263 standard, an image decoding apparatus must comprise two decoders based on the two schemes, which presents a problem of complicating the apparatus.

The present invention is implemented to solve the foregoing problems. Therefore, an object of the present invention is to provide an image decoding apparatus capable of decoding the H.263 coded bit stream 201, an image coding apparatus for generating a coded bit stream decodable by the image decoding apparatus, and an image communications system and a coded bit stream converting apparatus for converting the H.263 coded bit stream to the MPEG-4 coded bit stream to carry out communication, all of which apparatuses have a simple structure.

DISCLOSURE OF THE INVENTION

According to a first aspect of the present invention, there is provided an image decoding apparatus for decoding a first coded bit stream into which first header information and image coded data encoded in a first coding scheme are multiplexed, or for decoding a second coded bit stream into which second header information and image coded data encoded in a second coding scheme are multiplexed, the image decoding apparatus comprising: coding scheme decision means for making a decision as to whether a received coded bit stream is the first coded bit stream or the second coded bit stream in response to the first header information or to the second header information; decoding means for decoding image coding information on the second coding scheme included in the second header information by receiving the second coded bit stream; and setting means for setting, by receiving the first coded bit stream, the image coding information on the second coding scheme in response to image coding information on the first coding scheme included in the first header information, wherein the image decoding apparatus decodes the image coded data included in the first coded bit stream or in the second coded bit stream in response to the image coding information set by the setting means or in response to the image coding information decoded by the decoding means.

This offers an advantage of being able to decode the coded bit streams based on the different coding schemes.

In the image decoding apparatus in accordance with the present invention, the coding scheme decision means can make the decision in response to coding scheme identification information for identifying the first or second coding scheme, the coding scheme identification information being included in the first header information or in the second header information.

This offers an advantage of being able to decode the coded bit streams based on the different coding schemes with readily identifying the coding schemes.

In the image decoding apparatus in accordance with the present invention, the coding scheme decision means can make the decision in response to a start code included in the first header information or in the second header information.

This offers an advantage of being able to decode the coded bit streams based on the different coding schemes with readily identifying the coding schemes.

In the image decoding apparatus in accordance with the present invention, the coding scheme decision means can make the decision in response to an H.263 start code included in the first header information, or to a VOL (Video Object Layer) start code included in the second header information.

This offers an advantage of being able to decode the coded bit streams based on the H.263 and MPEG-4 coding schemes with readily identifying the coding schemes.

In the image decoding apparatus in accordance with the present invention, the coding scheme decision means can make the decision in response to a picture start code included in the first header information, or to a VO (Video Object) start code included in the second header information.

This offers an advantage of being able to decode the coded bit streams based on the H.263 and MPEG-4 coding schemes with readily identifying the coding schemes without adding new header information.

According to a second aspect of the present invention, there is provided an image coding apparatus comprising: coding means for generating a first coded bit stream by encoding an image signal in a first coding scheme; and header information multiplexing means for multiplexing, into the first coded bit stream, header information for ensuring compatibility with a second coded bit stream encoded in a second coding scheme.

This offers an advantage of being able to generate the first coded bit stream that can be decoded by the decoder for decoding the second coded bit stream.

In the image coding apparatus according to the present invention, the header information multiplexing means can multiplex, as the header information for ensuring the compatibility, a start code of the second coding scheme, and coding scheme identification information indicative of the first coding scheme.

This offers an advantage of being able to generate the first coded bit stream the decoder for decoding the second coded bit stream can decode with readily identifying the coding scheme.

According to a third aspect of the present invention, there is provided an image communications system comprising: coding means for generating a first coded bit stream by encoding an image signal in a first coding scheme; decoding means for decoding a second coded bit stream coded in a second coding scheme; and coded bit stream converting means for transmitting the first coded bit stream received from the coding means to the decoding means, after multiplexing into the first coded bit stream header information for ensuring compatibility, which is received from the decoding means.

This offers an advantage of being able to generate the first coded bit stream the decoder for decoding the second coded bit stream can decode with readily identifying the coding scheme.

According to a fourth aspect of the present invention, there is provided a coded bit stream converting apparatus comprising: syntax analyzing means for inputting a first coded bit stream generated in a first coding scheme, and for extracting first header information in the first coding scheme and image coded data; decoding means for decoding the first header information extracted; header information setting means for setting and coding second header information in a second coding scheme in response to the first header information decoded by the decoding means; and multiplexing means for generating a second coded bit stream by multiplexing image coded data extracted by the syntax analyzing means with the second header information coded by the header information setting means.

This offers an advantage of being able to readily convert the first coded bit stream to the second coded bit stream.

According to a fifth aspect of the present invention, there is provided an image decoding apparatus for decoding a first coded bit stream into which first header information and image coded data encoded in a first coding scheme are multiplexed, or for decoding a second coded bit stream into which second header information and image coded data encoded in a second coding scheme are multiplexed, the image decoding apparatus comprising: coding scheme decision means for making a decision as to whether a received coded bit stream is the first coded bit stream or the second coded bit stream in response to the first header information or to the second header information; first decoding means for decoding the first header information by receiving the first coded bit stream; and second decoding means for decoding image coding information on the second coding scheme included in the second header information by receiving the second coded bit stream, wherein the image decoding apparatus decodes, when the coded bit stream received is the first coded bit stream, the image coded data included in the first coded bit stream in response to the first header information decoded by the first decoding means, and decodes, when the coded bit stream received is the second coded bit stream, the image coded data included in the second coded bit stream in response to the image coding information decoded by the second decoding means.

This offers an advantage of being able to decode the coded bit streams based on the different coding schemes with readily identifying the coding schemes without adding new header information, and to decode the first coded bit stream without setting the image coding information on the second coding scheme.

BRIEF DESCRIPTION OF THE DRAWINGS

FIG. 2 is a diagram showing structures of a coded bit stream received by the image decoding apparatus of an embodiment 1 in accordance with the present invention;

FIG. 7 is a block diagram showing a configuration of the H.263 picture header information decoder in the embodiment 1 in accordance with the present invention;

FIG. 11 is a diagram showing a layer structure of H.263 macroblock data;

FIG. 13 is a block diagram showing a configuration of the block data decoder in the embodiment 1 in accordance with the present invention;

FIG. 23 is a block diagram showing a configuration of a header information analyzer of an embodiment 7 in accordance with the present invention 7;

FIG. 26 is a diagram showing a structure of GOB header information and a structure of resynchronization information.

BEST MODE FOR CARRYING OUT THE INVENTION

The invention will now be described in more detail with reference to the accompanying drawings.

EMBODIMENT 1

Figure 1A:
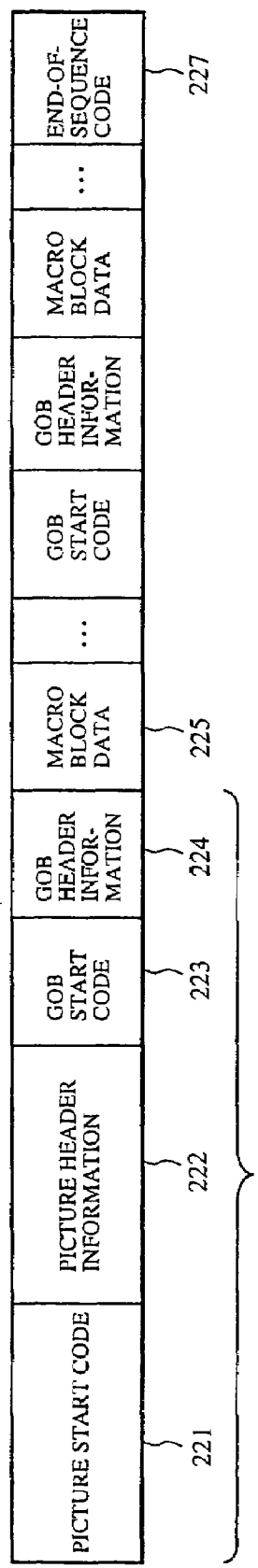
FIG. 1 is a diagram showing a structure of a conventional H.263 coded bit stream and a structure of an MPEG-4 coded bit stream.
Figure 1B:
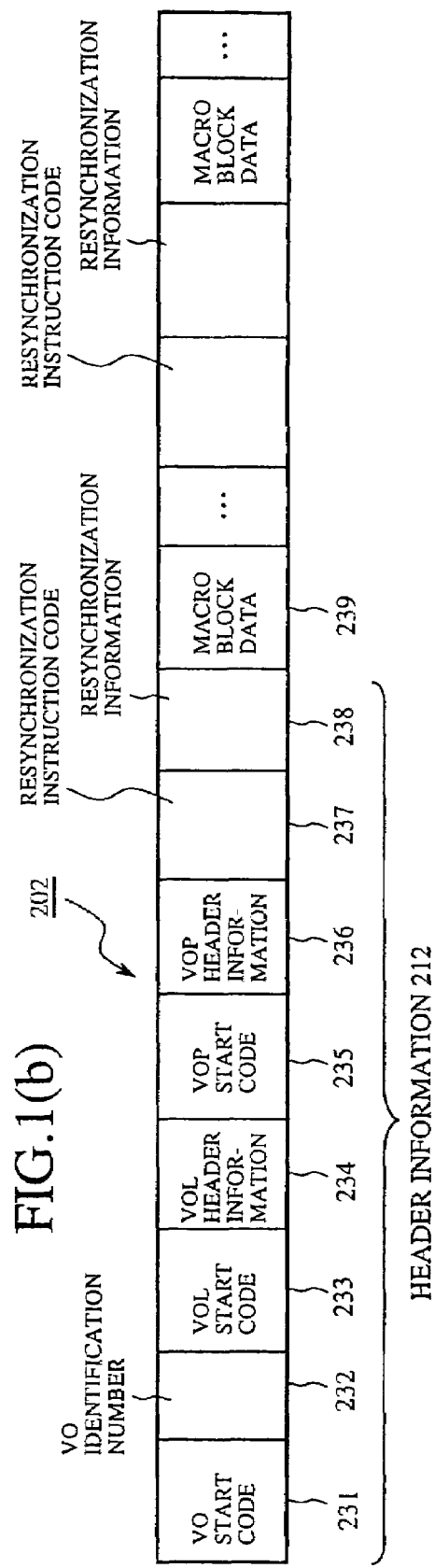

FIG. 2 is a diagram showing structures of a coded bit stream received by an image decoding apparatus of an embodiment 1, wherein FIG. 2(a) shows an MPEG-4 compatible H.263 coded bit stream 203, and FIG. 2(b) shows an MPEG-4 coded bit stream 204. The MPEG-4 compatible H.263 coded bit stream 203 as shown in FIG. 2(a) includes, in addition to the conventional H.263 coded bit stream 201 as shown in FIG. 1(a), a VO start code 231, a VO identification number 232, a VOL start code 233 and H.263 compatible identification information 226. The MPEG-4 coded bit stream 204 as shown in FIG. 2(b) includes, in addition to the conventional MPEG-4 coded bit stream 202 as shown in FIG. 1(b), H.263 compatible identification information 226. The H.263 compatible identification information 226 added to the MPEG-4 compatible H.263 coded bit stream 203 is distinguishable from that added to the MPEG-4 coded bit stream 204 because one of the H.263 compatible identification information is placed at "0", and the other information at "1".

Figure 3:
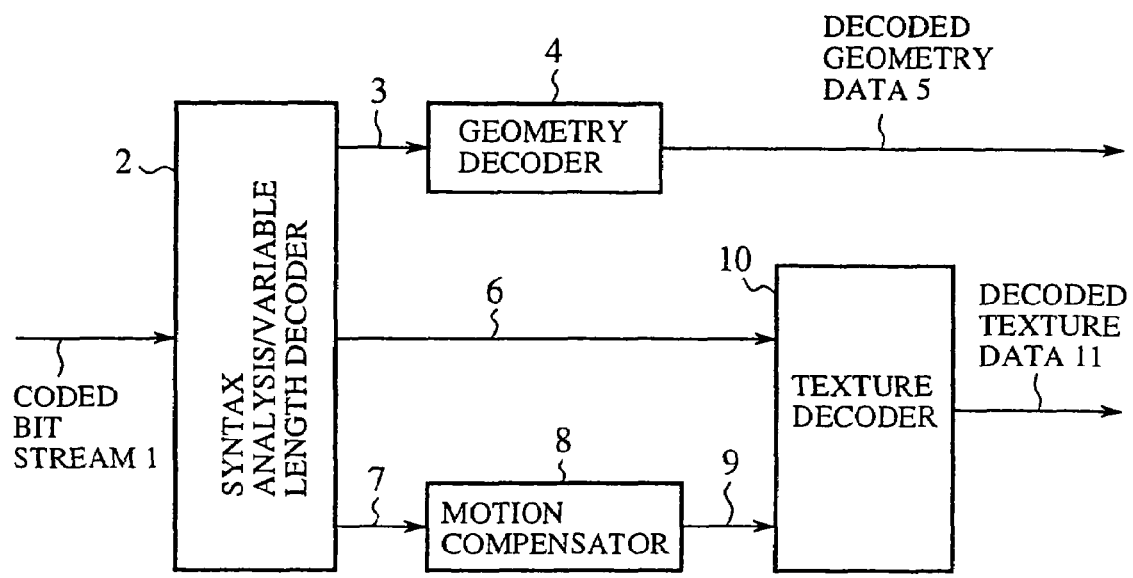
FIG. 3 is a block diagram showing a configuration of the image decoding apparatus of the embodiment 1 in accordance with the present invention.

FIG. 3 is a block diagram showing a configuration of an image decoding apparatus for decoding a VO (Video Object) in the embodiment 1. In FIG. 3, the reference numeral 1 designates a received coded bit stream; and 2 designates a syntax analysis/variable length decoder that analyzes in the coded bit stream 1 syntax (a multiplexed video signal), and outputs geometry coded data 3, texture coded data 6 and texture motion data 7. The reference numeral 4 designates a geometry decoder for obtaining decoded geometry data 5 by decoding the geometry coded data 3; 8 designates a motion compensator for carrying out motion compensation in response to the texture motion data 7 to obtain prediction texture data 9; and 10 designates a texture decoder for carrying out decoding in response to the texture coded data 6 and prediction texture data 9 to obtain decoded texture data 11.

Next, the operation will be described.

Here, decoding operation of the MPEG-4 compatible H.263 coded bit stream 203 as shown in FIG. 2(a), which is a subject matter of the present invention, will be chiefly described. In other words, a case will be described, in which shapes of individual VOPs are rectangular, that is, no bit stream includes geometry coded data, and the texture data or information about motion is encoded on a macroblock basis.

Incidentally, the basic operation for decoding the MPEG-4 coded bit stream 204 as shown in FIG. 2(b) is the same as the conventional operation.

First, the syntax analysis/variable length decoder 2 translates the input coded bit stream 1 from a binary bit stream to intelligible data. Thus, the syntax analysis/variable length decoder 2 enables the MPEG-4 compatible H.263 coded bit stream 203 to be decoded. The motion compensator 8 carries out the motion compensation in response to the texture motion data 7 output from the syntax analysis/variable length decoder 2, and outputs the prediction texture data 9. The texture decoder 10 receives the texture coded data 6 output from the syntax analysis/variable length decoder 2 and the prediction texture data 9 output from the motion compensator 8, and obtains the decoded texture data 11.

Next, the operation of the syntax analysis/variable length decoder 2 will be described.

Figure 4:
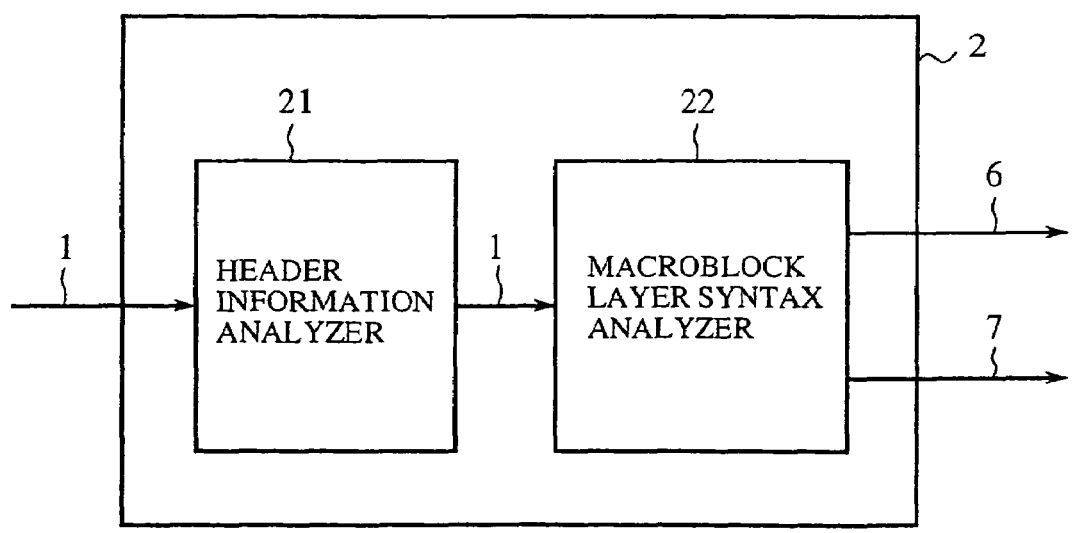
FIG. 4 is a block diagram showing a configuration of the syntax analysis/variable length decoder in the embodiment 1 in accordance with the present invention.

FIG. 4 is a block diagram showing a configuration of the syntax analysis/variable length decoder 2. In this figure, the reference numeral 21 designates a header information analyzer for extracting the header information added to the coded bit stream 1, and for setting various pieces of header information required for the subsequent decoding control; 22 designates a macroblock layer syntax analyzer for obtaining the texture coded data 6 and texture motion data 7 from the coded bit stream 1.

Figure 5:
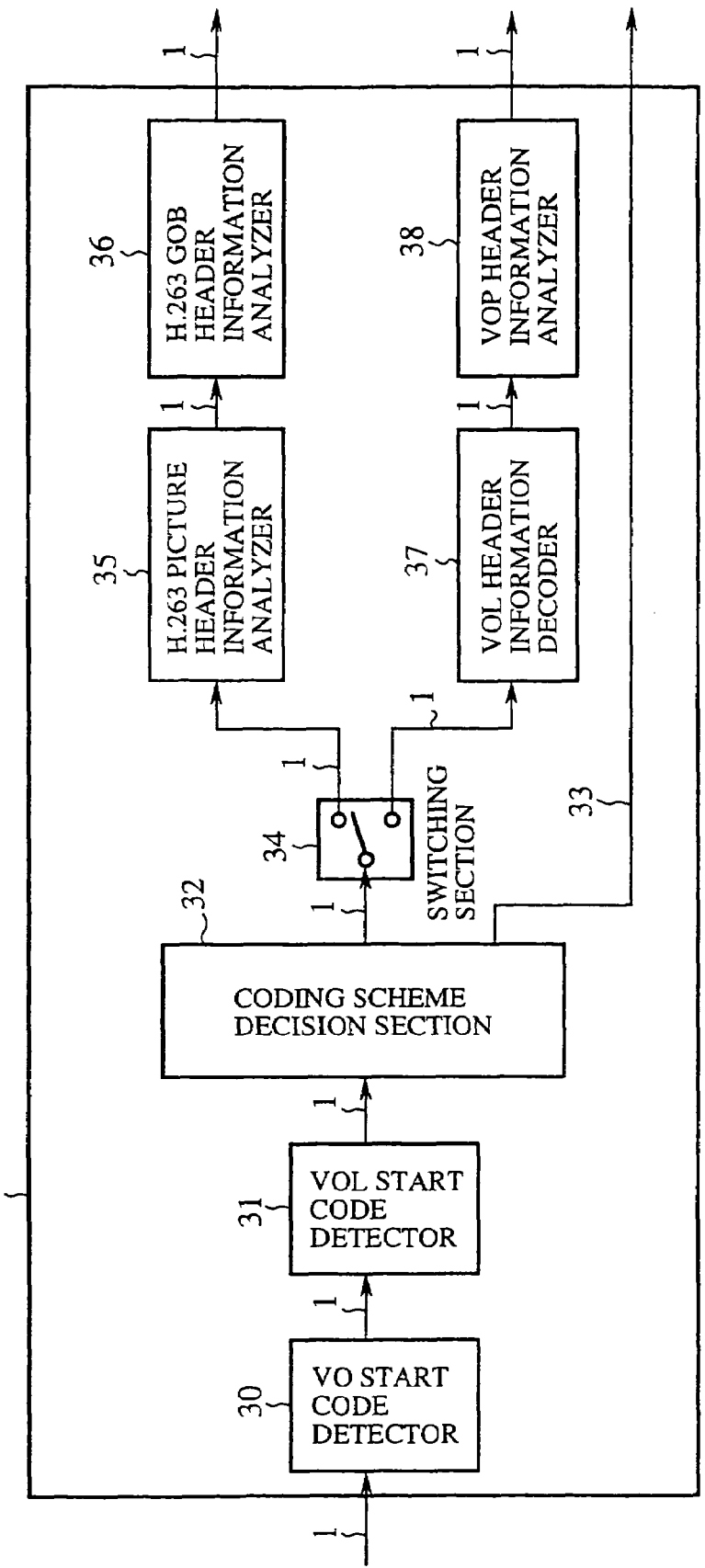
FIG. 5 is a block diagram showing a configuration of the header information analyzer in the embodiment 1 in accordance with the present invention.

FIG. 5 is a block diagram showing a configuration of the header information analyzer 21. In this figure, the reference numeral 30 designates a VO start code detector coded for detecting the VO start code 231 in the bit stream 1; 31 designates a VOL start code detector for detecting the VOL start code 233 from the coded bit stream 1; and 32 designates a coding scheme decision section for making a decision as to whether the coded bit stream 1 is the MPEG-4 compatible H.263 coded bit stream 203 or the MPEG-4 coded bit stream 204, and for outputting H.263 compatible identification information 33. The reference numeral 34 designates a switching section switched in response to the decided coding scheme; 35 designates an H.263 picture header information analyzer for decoding from the MPEG-4 compatible H.263 coded bit stream 203 the picture header information 222 which is the image coding information unique to the H263 system, and for setting the VOL header information 234 and VOP header information 236 which are the image coding information unique to the MPEG-4 system; 36 designates an H.263 GOB header information analyzer for decoding from the MPEG-4 compatible H.263 coded bit stream 203 the H.263 GOB (Group of Block) header information 224, and for updating, in response to the GOB header information 224 decoded, the VOP header information 236 set by the H.263 picture header analyzer 35; 37 designates a VOL header information decoder for decoding the VOL header information 234 from the MPEG-4 coded bit stream 204; and 38 designates a VOP header information analyzer for decoding the VOP header information 236 from the MPEG-4 coded bit stream 204.

Next, the operation of the header information analyzer 21 will be described.

Detecting the VO start code 231 in the MPEG-4 compatible H.263 coded bit stream 203 or in the MPEG-4 coded bit stream 204 as shown in FIG. 2, the VO start code detector 30 starts the following decoding operation. Specifically, the VOL start code detector 31 detects the VOL start code 233 in the coded bit stream 1. The coding scheme decision section 32 decodes from the coded bit stream 1 the H.263 compatible identification information 226, and makes a decision from the H.263 compatible identification information 226 as to whether the coded bit stream 1 is the MPEG-4 compatible H.263 coded bit stream 203 or the MPEG-4 coded bit stream 204, thereby outputting the H.263 compatible identification information 33.

When the coded bit stream 1 is the MPEG-4 compatible H.263 coded bit stream 203, the switching section 34 supplies the coded bit stream 1 to the H.263 picture header information analyzer 35.

Figure 6:
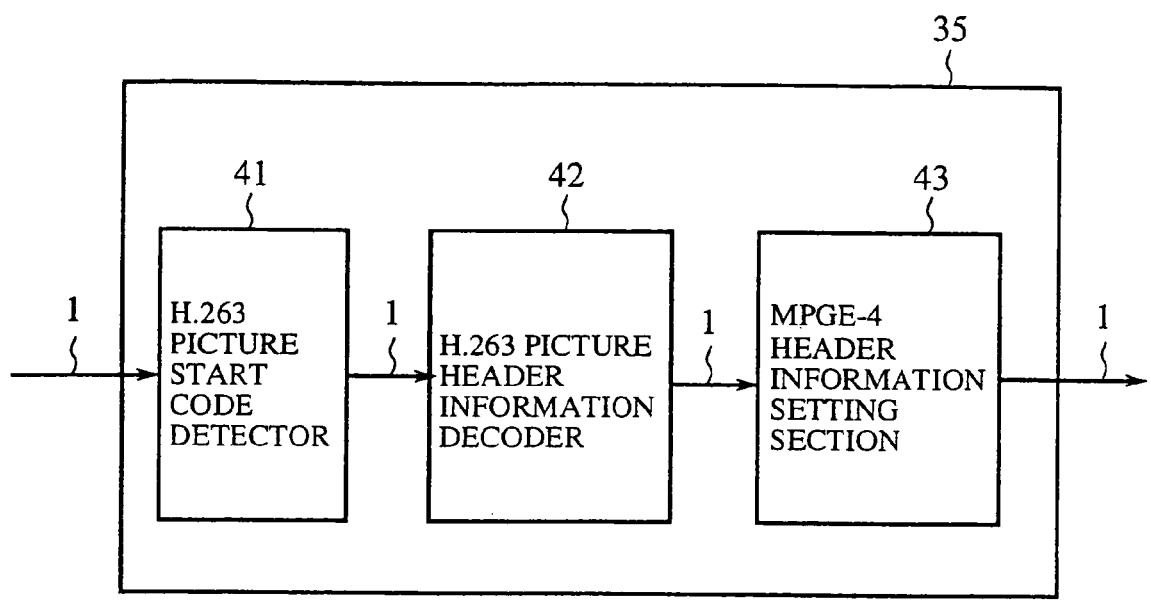
FIG. 6 is a block diagram showing a configuration of the H.263 picture header information analyzer in the embodiment 1 in accordance with the present invention.

FIG. 6 is a block diagram showing a configuration of the H.263 picture header information analyzer 35. When an H.263 picture start code detector 41 detects the picture start code 221 in the coded bit stream 1, a subsequent H.263 picture header information decoder 42 decodes the picture header information 222 from the coded bit stream 1. Then, an MPEG-4 header information setting section 43 sets the VOL header information 234 and VOP header information 236 in response to the picture header information 222 decoded.

FIG. 7 is a block diagram showing a configuration of the H.263 picture header information decoder 42. A temporal reference (TR) decoder 51 receives the bit stream 1 from the H.263 picture start code detector 41, and decodes the number of pictures (TR) that are skipped or not referred to among the transmitted pictures. This information is used for display as needed.

Next, a picture type (PTYPE) decoder 52 decodes the picture type (PTYPE). The picture type includes information such as a picture format 301, a picture coding type 302 and an optional mode indication flag 303. The picture format 301 and picture coding type 302 decoded are supplied to the MPEG-4 header information setting section 43 shown in FIG. 6.

The picture type (PTYPE) decoder 52 makes a decision as to whether the optional mode indication flag 303 is ON or not. Although the H.263 standard offers several optional modes, the image decoding apparatus described in the present embodiment does not ensure the compatibility between bit streams containing the optional modes. Thus, the coded bit stream with the optional mode being ON (valid) is supplied to a decoding operation terminating section 54 through a switching section 53 so that the decoding operation terminating section 54 completes the decoding operation of the coded bit stream. The picture type includes information defining display or others, which are available as need.

In contrast, the bit stream with the optional mode being OFF (invalid) is supplied to a picture quantization step size (PQUANT) decoder 55 through the switching section 53. The picture quantization step size (PQUANT) decoder 55 decodes a picture quantization step size (PQUANT) 304. The picture quantization step size 304 decoded is supplied to the MPEG-4 header information setting section 43 shown in FIG. 6. The picture header information after the picture quantization step size 304 is skipped because it is not required in the subsequent decoding.

Next, the operation of the MPEG-4 header information setting section 43 as shown in FIG. 6 will be described.

The MPEG-4 header information setting section 43 sets, in response to the picture header information 222 decoded, VOL geometry information and object size as the VOL header information 234. It also sets, in the case of the MPEG-4 compatible H.263 coded bit stream, the information indicating that the geometry information represents rectangles, in which case, the individual bit streams correspond to frames each. Furthermore, since the object size corresponds to the frame size, the MPEG-4 header information setting section 43 obtains the frame size from the picture format 301, one of the picture header information 222, and sets the object size. In addition, it also sets information about whether the gray scale per pixel is eight bits or not. Because the H.263 system assumes that the gray scale per pixel is always eight bits, it is placed at eight bits.

Next, the MPEG-4 header information setting section 43 invalidates the MPEG-4 based coding conditions, that is, the sprite coding, error resistant coding, intra AC/DC prediction and scalability coding. Because the MPEG-4 can select its quantization scheme from the two schemes H.263 and MPEG-1/2, the quantization scheme is set in advance at the H.263 when using the MPEG-4 compatible H.263 coded bit stream 203.

Furthermore, the MPEG-4 header information setting section 43 sets the VOP header information 236. Specifically, it sets as the VOP header information 236, the VOP prediction type information and quantization step size. The VOP prediction type includes intra coding that uses only the data within the VOP, and inter coding that also uses data before and after the VOP. The VOP prediction type information is set in response to a picture coding type 302, one of the picture header information 222. Besides, the VOP quantization step size is set in accordance with a picture quantization step size 304, one of the picture header information 222.

Moreover, because the MPEG-4 can select its motion vector search range from seven types, it has a code for designating the motion vector search range. However, since the H.263 corresponds to only one of the search ranges, it is necessary for the MPEG-4 header information setting section 43 to set the motion vector search range designation code corresponding to the motion vector search range the H.263 employs. In addition, although the MPEG-4 is interlace image compatible, the H.263 is interlace incompatible. Thus, interlace mode indication information is always set invalid.

After the H.263 picture header information analyzer 35 as shown in FIG. 5 completes the analysis of the picture header information, the H.263 GOB header information analyzer 36 starts the analysis of the GOB header information 224, when the coded bit stream includes the GOB start code 223 and GOB header information 224. When the coded bit stream does not include the GOB start code 223 or GOB header information 224, the H.263 GOB header information analyzer 36 does not operate.

Figure 8:
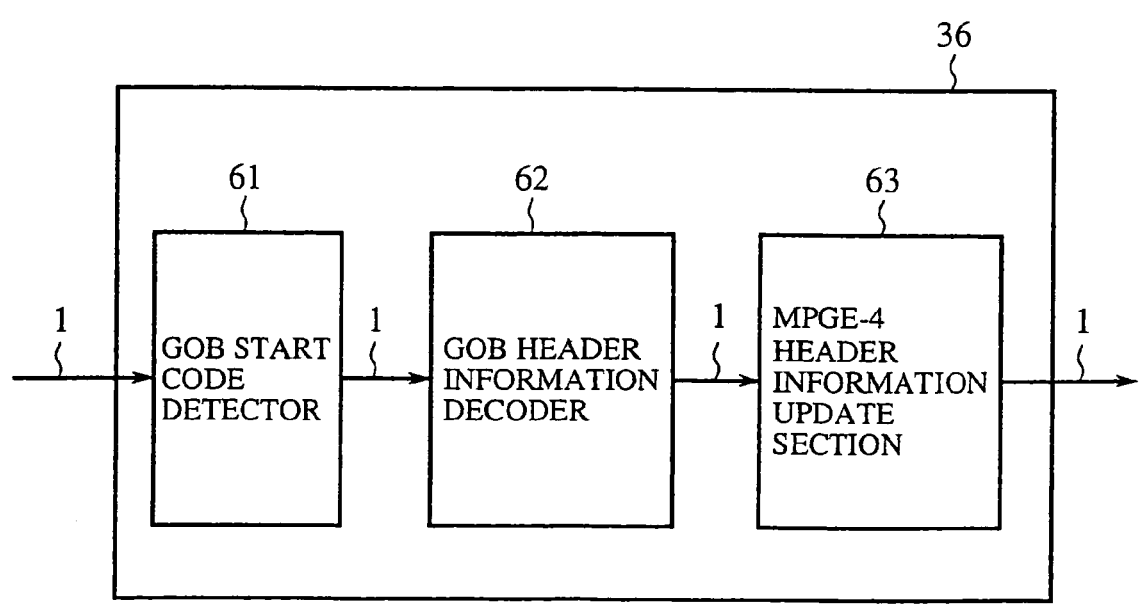
FIG. 8 is a block diagram showing a configuration of the H.263 GOB header information analyzer in the embodiment 1 in accordance with the present invention.

FIG. 8 is a block diagram showing a configuration of the H.263 GOB header information analyzer 36 as shown in FIG. 5. When a GOB start code detector 61 detects the GOB start code 223 attached to the coded bit stream 1, a GOB header information decoder 62 decodes the GOB header information 224.

Figure 9:
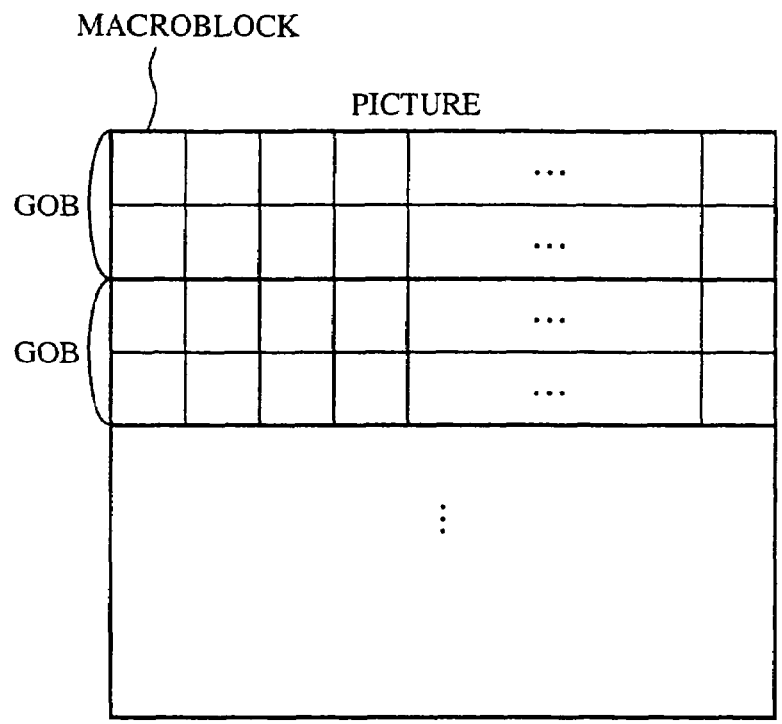
FIG. 9 is a diagram illustrating a GOB.

FIG. 9 illustrates GOBs. As shown in this figure, each GOB includes a series of macroblocks formed by dividing an image, and the GOB header information 224 includes information required for establishing resynchronization at a decoding side. A bit error in the coded bit stream will propagate to subsequent macroblock data in the case of variable length coding or prediction coding, thereby impairing correct decoding. The detection of the GOB header information can prevent the propagation of the error because it establishes the resynchronization of the coded bit stream before decoding the initial macroblock of the GOB, and thus resets the information needed for decoding the successive macroblocks. The quantization step size and the motion vector of each macroblock must be reset when the resynchronization is established, because they undergo the prediction coding that codes the differences between the quantization step sizes and between the motion vectors of the current and previous coded macroblocks.

Figure 10:
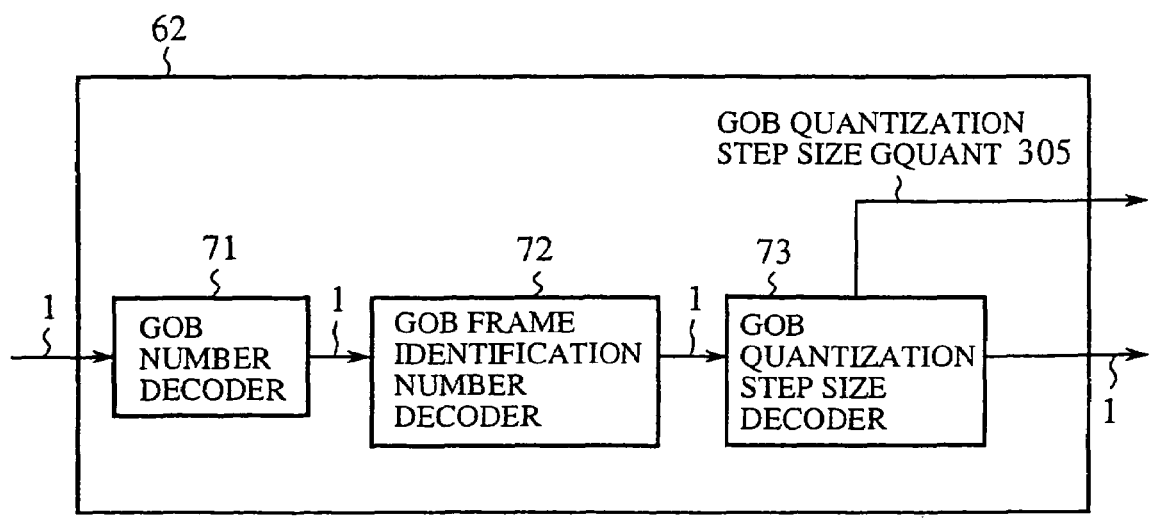
FIG. 10 is a block diagram showing a configuration of the GOB header information decoder in the embodiment 1 in accordance with the present invention.

FIG. 10 is a block diagram showing a configuration of a GOB header information decoder 62. A GOB number decoder 71 decodes a GOB number (GN) from the coded bit stream 1. A GOB frame identification number decoder 72 decodes the identification number (GFID) of a picture to which the GOB belongs. A GOB quantization step size decoder 73 decodes a GOB quantization step size (GQUANT) 305, and supplies it to an MPEG-4 header information update section 63 as shown in FIG. 8.

The MPEG-4 header information update section 63 updates, in response to the decoded GOB header information 224, the VOP header information 236 set by the MPEG-4 header information setting section 43. It is the quantization step size that is updated in response to the GOB header information 224. Thus, the GOB quantization step size is placed at the VOP quantization step size. The foregoing pieces of information that are set are supplied to the macroblock layer syntax analyzer 22 as shown in FIG. 4.

The coding scheme decision section 32 as shown in FIG. 5 makes a decision, when the H.263 compatible identification information 226 indicates the MPEG-4, that the coded bit stream 1 is the MPEG-4 coded bit stream 204, and outputs the H.263 compatible identification information 33. The MPEG-4 coded bit stream 204 is supplied to the VOL header information decoder 37 through the switching section 34. The VOL header information decoder 37 decodes the VOL header information 234 from the coded bit stream, and the VOP header information analyzer 38 decodes the VOP header information 236, and supplies it to the macroblock layer syntax analyzer 22 of FIG. 4.

After setting the foregoing information, the macroblock layer syntax analyzer 22 decodes the macroblock data 225 or 239 through the analysis based on the MPEG-4 syntax. However, since the coding scheme of the block data differs a little between the MPEG-4 and H.263, the decoding side must also switch the operation mode.

FIG. 11 is a diagram showing a layer structure of the macroblock data 225 in the MPEG-4 compatible H.263 bit stream 203 in the present embodiment 1. The macroblock consists of four luminance blocks and two color difference blocks. As shown in FIG. 11, each macroblock includes macroblock skip decision information 251, macroblock type/ valid color difference block identification information 252, valid block identification information 253, differential quantization step size 254 and motion data 255, which are multiplexed as attribute information.

Here, the macroblock skip decision information 251 indicates whether the motion vector is zero and all the coefficient data within the macroblock in the inter VOP are zero (the coefficient data are obtained by passing the input image signal (the original signal when intra coded, and the differential signal between it and a reference VOP when inter coded) through the DCT, and then through the quantization). When the motion vector is zero and all the coefficient data are zero, the subsequent information about the macroblock is excluded from the bit stream, and skipping to the next macroblock is carried out.

The macroblock type in the macroblock type/valid color difference block identification information 252 indicates a macroblock coding type when the macroblock data is coded using the original signal of the macroblock (intra), or when the differential signal between the macroblock and the reference macroblock is coded after the motion compensation prediction (inter), or when the current macroblock is coded using the quantization step size different from the quantization step size of the immediately previous macroblock.

The valid block identification information 253 indicates whether the coefficient data of the blocks are all zero or not. Although the foregoing attribute information is followed by coefficient data (corresponding to block data 256) multiplexed into each block, the coefficient data of the block is absent when the valid block identification information 253 indicates that it is a invalid block.

The differential quantization step size 254 is information multiplexed when the macroblock type indicates that the quantization step size of the current macroblock differs from that of the immediately preceding macroblock, and indicates the differential value from the quantization step size of the preceding macroblock.

Figure 12:
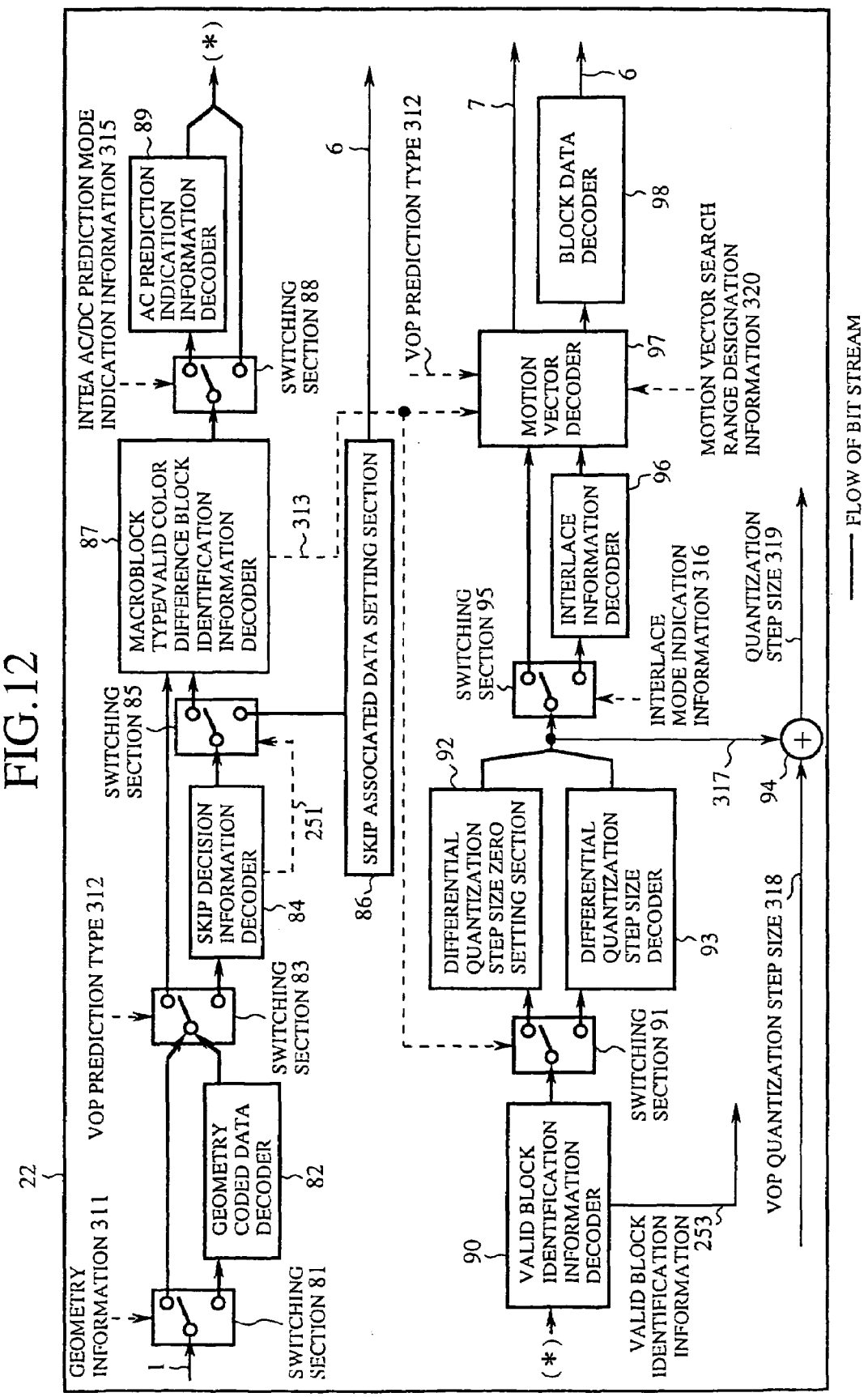
FIG. 12 is a block diagram showing a configuration of the macroblock layer syntax analyzer in the embodiment 1 in accordance with the present invention.
Figure 14A:
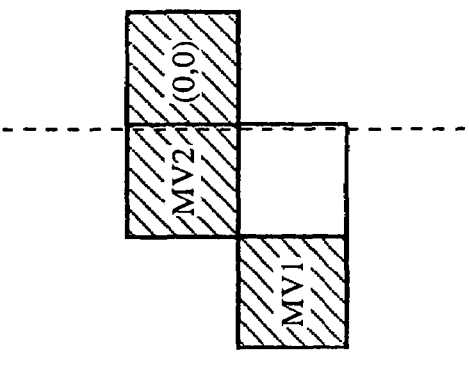
FIG. 14 is a diagram illustrating calculation of a prediction vector.
Figure 14B:
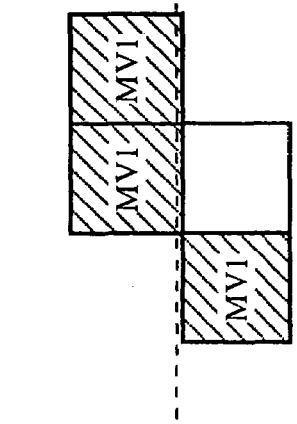
Figure 14C:
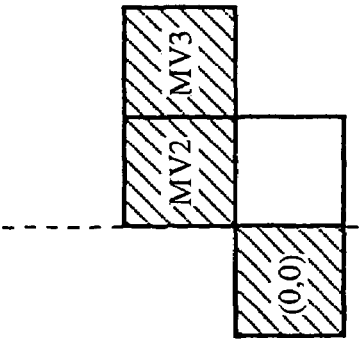
Figure 14D:
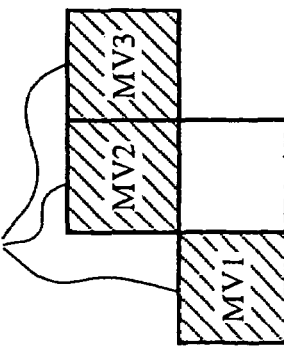

FIG. 12 is a block diagram showing a configuration of the macroblock layer syntax analyzer 22. In this figure, the reference numeral 81 designates a switching section that is switched in response to geometry information 311 set by the MPEG-4 header information setting section 43; 82 designates a geometry coded data decoder for decoding the geometry coded data in the coded bit stream; 83 designates a switching section that is switched in response to VOP prediction type 312 set by the MPEG-4 header information setting section 43; 84 designates a skip decision information decoder for decoding, when the VOP prediction type is other than the intra coding, the macroblock skip decision information 251; 85 designates a switching section that is switched in response to the skip decision information 251; 86 designates a skip associated data setting section for placing all the motion vector and texture data in the macroblock to zero when skipping; and 87 designates a macroblock type/valid color difference block identification information decoder for decoding macroblock type 313 and valid color difference block identification information when the VOP prediction type 312 is intra or the skipping is not carried out.

The reference numeral 88 designates a switching section that is switched in response to intra AC/DC prediction mode indication information 315 set by the MPEG-4 header information setting section 43; 89 designates an AC prediction indication information decoder for decoding AC prediction indication information; 90 designates a valid block identification information decoder for decoding the valid block identification information 253; and 91 designates a switching section that is switched in response to the macroblock type 313 output from the macroblock type/valid color difference block identification information decoder 87.

The reference numeral 92 designates a differential quantization step size zero setting section for placing the differential quantization step size to zero; 93 designates a differential quantization step size decoder for decoding a differential quantization step size 317; 94 designates an adder for adding the differential quantization step size 317 and a VOP quantization step size 318 of the previous block, and supplies a quantization step size 319 to the texture decoder 10 of FIG. 3; 95 designates a switching section that is switched in response to interlace mode indication information 316 fed from the MPEG-4 header information setting section 43; 96 designates an interlace information decoder for decoding interlace information; 97 designates a motion vector decoder for decoding a motion vector (texture motion data 7) in response to the macroblock type 313 output from the macroblock type/valid color difference block identification information decoder 87, to the VOP prediction type 312 output from the MPEG-4 header information setting section 43 and to motion vector search range designation information 320; and 98 designates a block data decoder for decoding the coded block data, and supplies the texture coded data 6 to the texture decoder 10.

Next, the operation of the macroblock layer syntax analyzer 22 will be described.

The following description will be made for the coded bit stream 1 consisting of the MPEG-4 compatible H.263 coded bit stream 203. As for the MPEG-4 coded bit stream 204, the description will be omitted here because it is described in the ISO/IEC JTC1/SC29/WG11 MPEG-4 Video VM8.0.

First, the switching section 81 switches the output of the coded bit stream 1 in response to the geometry information 311 set by the MPEG-4 header information setting section 43. When the coded bit stream 1 consists of the MPEG-4 compatible H.263 coded bit stream 203, the geometry information 311 is rectangular, and hence the bit stream 1 is directly supplied to the switching section 83 without passing through the geometry coded data decoder 82.

Subsequently, the switching section 83 carries out its switching in response to the VOP prediction type 312 set by the MPEG-4 header information setting section 43. When the VOP prediction type 312 is intra, the macroblock type/valid color difference block identification information decoder 87 decodes the macroblock type 313 and the valid color difference block identification information. When the VOP prediction type is other than intra, the skip decision information decoder 84 decodes the skip decision information 251 of the macroblock. The skip decision information 251 decoded switches the switching section 85 such that when it indicates that the macroblock is to be skipped, the skip associated data setting section 86 places both the motion vector of the macroblock and the texture data in the macroblock all at zero, and completes the decoding of the macroblock. In contrast, when the skip decision information 251 indicates that the macroblock must not be skipped, the macroblock type/valid color difference block identification-information decoder 87 decodes the macroblock type 313 and the valid color difference block identification information.

Next, the switching section 88 is switched in response to the intra AC/DC prediction mode indication information 315 set by the MPEG-4 header information setting section 43. As for the MPEG-4 compatible H.263 coded bit stream 203, because it does not have a function to carry out the intra AC/DC prediction, and hence the intra AC/DC prediction is set invalid when setting the VOL header information 234, it is supplied to the valid block identification information decoder 90 without passing through the AC prediction indication information decoder 89.

The valid block identification information decoder 90 decodes the valid block identification information 253 for the luminance block in the macroblock. The switching section 91 is switched in response to the macroblock type 313 decoded by the macroblock type/valid color difference block identification information decoder 87 so that when the quantization step size of the instant macroblock differs from that of the first previous macroblock, the differential quantization step size decoder 93 decodes the differential quantization step size 317 between the quantization step size of the instant macroblock and that of the first previous macroblock. The differential quantization step size 317 decoded is added to the VOP quantization step size 318 of the first previous macroblock by the adder 94, and the sum is supplied to the texture decoder 10 of FIG. 3 as the quantization step size 319.

In contrast, when the quantization step size of the current macroblock equals that of the first previous macroblock, the differential quantization step size zero setting section 92 places the differential quantization step size at zero.

Subsequently, the switching section 95 is switched in response to the interlace mode indication information 316 fed from the MPEG-4 header information setting section 43. As for the MPEG-4 compatible H.263 coded bit stream 203, because it does not correspond to the interlace image, the interlace mode is set invalid, and hence it is supplied to the motion vector decoder 97 without passing through the interlace information decoder 96. The motion vector decoder 97 decodes, when the VOP prediction type 312 set by the MPEG-4 header information setting section 43 is inter, the motion vector (texture motion data 7) in response to the macroblock type 313 decoded by the macroblock type/valid color difference block identification information decoder 87 and to the motion vector search range designation information 320 set by the MPEG-4 header information setting section 43, and supplies the motion vector to the motion compensator 8 of FIG. 3.

Subsequently, the block data decoder 98 decodes the coded block data in the coded bit stream. FIG. 13 is a block diagram showing a configuration of the block data decoder 98. In this figure, the reference numeral 101 designates a switching section that receives the coded block data, and is switched in response to the macroblock type 313 fed from the macroblock type/valid color difference block identification information decoder 87; 102 designates a switching section that is switched in response to the intra AC/DC prediction mode indication information 315 set by the MPEG-4 header information setting section 43; 103 designates a DC coefficient fixed length decoder that carries out, when the intra AC/DC prediction is OFF, the DC coefficient fixed length decoding in response to gray scale per pixel 321 fed from the MPEG-4 header information setting section 43, and outputs a decoded intra DC coefficient 111; and 104 designates a DC coefficient decoder that decodes the DC coefficient when the intra AC/DC prediction is ON, and outputs the decoded intra DC coefficient 111.

The reference numeral 105 designates a switching section that is switched in response to the valid block identification information 253 fed from the valid block identification information decoder 90; and 106 designates an AC coefficient VLD table switching section for switching an AC coefficient VLD (Variable Length Decoding) table in response to the macroblock type 313 fed from the macroblock type/valid color difference block identification information decoder 87 and to the H.263 compatible identification information 33 fed from the coding scheme decision section 32.

The reference numeral 107 designates an AC coefficient data variable length decoder that carries out the variable length decoding of the AC coefficient data, and outputs decoded AC coefficient data 112; 108 designates a switching section that is switched in response to the H.263 compatible identification information 33 fed from the coding scheme decision section 32; 109 designates an AC coefficient data fixed length decoder for outputting the decoded AC coefficient data 112; 110 designates an AC coefficient data Esc coding decoder for outputting the decoded AC coefficient data 112; and 113 designates an AC coefficient zero setting section for placing the AC coefficient at zero.

Next, the operation of the block data decoder 98 will be described.

First, the coded block data is switched by the switching section 101 in response to the macroblock type 313 fed from the macroblock type/valid color difference block identification information decoder 87 such that it is supplied to the switching section 105 when the macroblock type 313 is other than intra. When the macroblock type 313 is intra, the coded block data is supplied to the switching section 102 which is switched in response to the intra AC/DC prediction mode indication information 315 set by the MPEG-4 header information setting section 43.

As for the MPEG-4 compatible H.263 coded bit stream 203, because the intra AC/DC prediction mode 315 is set invalid, it does not pass through the DC coefficient decoder 104, but is supplied to the DC coefficient fixed length decoder 103. The DC coefficient fixed length decoder 103 carries out the fixed length decoding, and supplies the decoded intra DC coefficient 111 to the texture decoder 10, and the coded block data to the switching section 105. In this case, the length of the code passing through the fixed length decoding equals the gray scale per pixel (the default is 8 bits) 321 set by the MPEG-4 header information setting section 43. Since the gray scale per pixel 321 has the default of 8 bits, it equals that of the H.263 decoder.

The switching section 105 is switched in response to the valid block identification information 253 decoded by the valid block identification information decoder 90 such that when the block is invalid, the AC coefficient zero setting section 113 places the decoded AC coefficient data 112 in the block at zero, and supplies it to the texture decoder 10. When the block is valid, the coded block data is supplied to the AC coefficient VLD table switching section 106.

The AC coefficients in the block undergo the variable length coding by the encoder side that scans the coefficients in the block in a predetermined sequence, and encodes them with generating a combination consisting of a flag (LAST) indicating whether a non-zero coefficient is the final one in the block, and of the number of consecutive zeros (RUN) and the level of the successive non-zero coefficients (LEVEL). The decoder side carries out the variable length decoding of the coded data to obtain the combination (LAST, RUN and LEVEL) so that it can reproduce the AC coefficients in the block. Incidentally, when carrying out the variable length coding of the combination (LAST, RUN and LEVEL), although the MPEG-4 performs the variable length coding using different VLC (Variable Length Coding) tables in accordance with the macroblock type, the H.263 carries out the variable length coding using the same VLC table independently of the macroblock type.

Thus, in the image decoding apparatus in the present embodiment, the AC coefficient VLD table switching section 106 switches the AC coefficient VLD table in response to the macroblock type 313 fed from the macroblock type/valid color difference block identification information decoder 87 and the H.263 compatible identification information 33 fed from the coding scheme decision section 32. When the H.263 compatible identification information 33 is set at the H.263, the AC coefficient data variable length decoder 107 carries out the variable length decoding using the single VLD table regardless of the macroblock type (intra or inter) 313, and supplies the decoded AC coefficient data 112 to the texture decoder 10 as the coded texture data 6.

The coding scheme in the case where the combination (LAST, RUN and LEVEL) is not present in the VLC table also differs in the MPEG-4 and in the H.263. When the combination (LAST, RUN and LEVEL) is not present in the VLC table, the MPEG-4 encodes the Escape code followed by the value correction of the RUN or LEVEL, and carries out either the variable length coding or the fixed length coding. In contrast, the H.263 encodes the Escape code, and then carried out the fixed length coding of the values of the LAST, RUN and LEVEL.

Thus, in the image decoding apparatus of the present embodiment, when the AC coefficient data variable length decoder 107 detects the Escape code in the AC coefficient coded data, it supplies the coded bit stream to the switching section 108. When the H.263 compatible identification information 33 is set at the H.263, the coded bit stream is supplied not to the AC coefficient data Esc coding decoder 110 but to the AC coefficient data fixed length decoder 109 so that it carries out the fixed length decoding of the subsequent code about the LAST, RUN and LEVEL in their predetermined code length, and supplies the decoded AC coefficient data 112 to the texture decoder 10 as the texture coded data 6.

By the foregoing operation, the texture coded data 6 and the motion vector (texture motion data 7) output from the macroblock layer syntax analyzer 22 are delivered to the texture decoder 10 and the motion compensator 8, respectively.

As described above, the syntax analysis/variable length decoder 2 as shown in FIG. 3 decodes and establishes the VOP prediction mode. When the VOP prediction mode is inter, the differential vector in the texture motion vector is decoded. The differential vector in the texture motion vector decoded is the differential vector between the prediction vector obtained from motion vectors of three neighboring macroblocks and the actual motion vector. Thus, the motion vector (texture motion data 8) is calculated by adding the differential vector of the motion vector to the prediction vector.

The prediction vector is calculated from the motion vectors of the three neighboring macroblocks (MV1, MV2 and MV3), which have already been decoded as shown in FIG. 14($a$). When any one of the three neighboring macroblocks is located outside the VOP, the motion vector of the macroblock outside the VOP is placed at the zero vector as shown in FIG. 14($b$) or 14($d$). Alternatively, it can be set using the motion vector of the same macroblock in the VOP as shown in FIG. 14($c$). However, when the coding scheme is H.263, and the GOB header is defined, it is necessary for the prediction vector to be set within the boundary of the GOB. The prediction vector is set as in the VOP. In response to the decoded vector, the prediction vector is extracted as the prediction texture data 9 to be output to the texture decoder 10.

In contrast, when the VOP prediction mode is intra, the motion compensation prediction is not carried out.

The texture decoder 10 receives the texture coded data 6, and restores the texture data 11.

Figure 15:
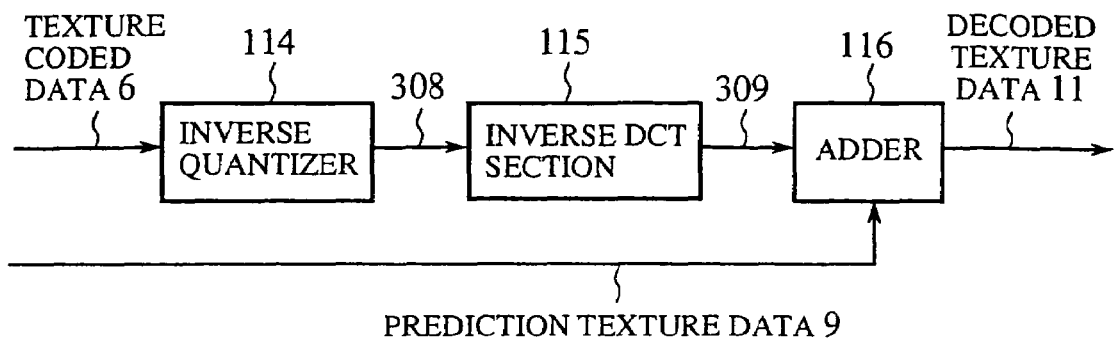
FIG. 15 is a block diagram showing a configuration of the texture decoder in the embodiment 1 in accordance with the present invention.

FIG. 15 is a block diagram showing a configuration of the texture decoder 10. An inverse quantizer 114 carries out the inverse quantization of the texture coded data 6.

Figure 16:
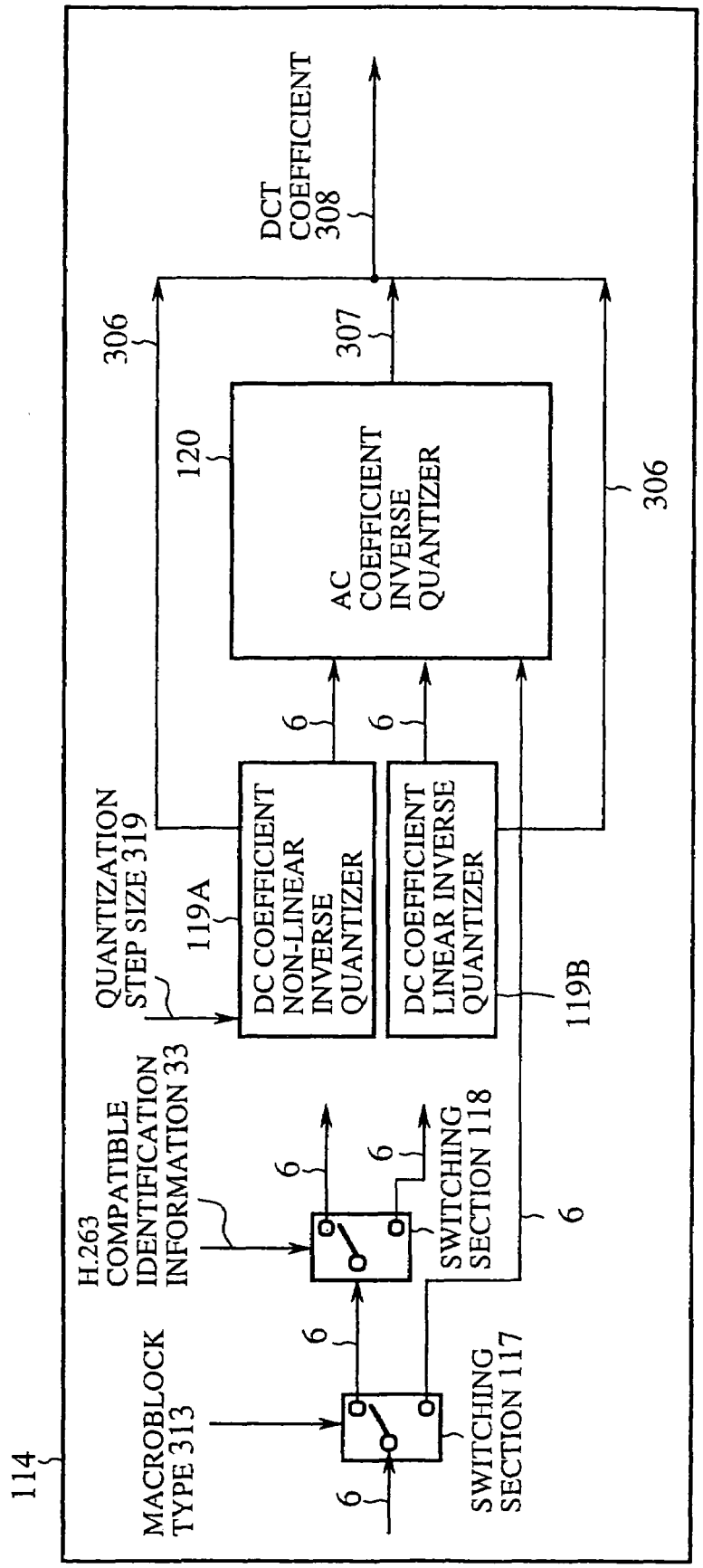
FIG. 16 is a block diagram showing a configuration of the inverse quantizer in the embodiment 1 in accordance with the present invention.

FIG. 16 is a block diagram showing a configuration of the inverse quantizer 114.

A switching section 117 is switched in response to the macroblock type 313 contained in the texture coded data 6. Because the texture coded data 6 is not included in the DC coefficient data when the macroblock type 313 of the block to be decoded is the inter coded mode, the texture coded data 6 is directly supplied to an AC coefficient inverse quantizer 120. In contrast, when the macroblock type 313 of the block to be decoded is intra coded mode, the texture coded data 6 is supplied to the switching section 118.

The switching section 118 is switched in response to the H.263 compatible identification information 33. When the H.263 compatible identification information 33 indicates the MPEG-4 compatible H.263 coded bit stream 203, a DC coefficient linear inverse quantizer 119B carries out the inverse quantization of the DC coefficient data contained in the texture coded data 6. On the other hand, when the H.263 compatible identification information 33 indicates the MPEG-4 coded bit stream 204, the DC coefficient non-linear inverse quantizer 119A carries out the inverse quantization of the DC coefficient data, and outputs a DC coefficient 306. The DC coefficient quantization is carried out by dividing the DC coefficient by a predetermined value (called quantization scale), and by dropping the fractional portion. Therefore, the decoding side can restore the DC coefficient 306 by multiplying the quantization DC coefficient by the quantization scale. The DC coefficient linear inverse quantizer 119B differs from the DC coefficient non-linear inverse quantizer 119A in the setting of the value of the quantization scale. The DC coefficient linear inverse quantizer 119B carries out the inverse quantization using a fixed value 8 as the quantization scale. In contrast, the DC coefficient non-linear inverse quantizer 119A non-linearly establishes the value of the quantization scale in accordance with the range of the quantization step size 319, and carries out the inverse quantization using the quantization scale, thereby outputting the DC coefficient 306.

The AC coefficient inverse quantizer 120 carries out the inverse quantization of the AC coefficient data, and outputs an AC coefficient 307. The DC coefficient 306 (which is present only in the intra coded mode) passing through the inverse quantization and the AC coefficient 307 are transferred to an inverse DCT section 115 as a DCT coefficient 308 which undergoes the inverse DCT, and is output as a decoded prediction error signal 309. An adder 116 adds the decoded prediction error signal 309 to the prediction texture data 9 obtained by the motion compensator 8, and outputs the sum as the decoded texture data 11. The addition of the prediction texture data 9 is not performed in the intra coded mode.

When the coded bit stream 1 includes the H.263 compatible identification information 33 multiplexed thereinto, it may sometimes include an end-of-sequence code (EOS) 227 indicating the end of the sequence, which is multiplexed thereinto as shown in FIG. 2(a). The end-of-sequence code 227 is detected by the picture start code detector 41 so that the decoding operation is completed on the detection of the end-of-sequence code 227.

As described above, the present embodiment 1 is configured such that it receives the MPEG-4 compatible H.263 coded bit stream 203 consisting of the H.263 coded bit stream 201 into which the VO start code 231, VOL start code, VO identification number 232 and H.263 compatible identification information 226 are multiplexed, and decodes these information items. This offers an advantage of being able to implement an image decoding apparatus having compatibility between the H.263 and MPEG-4.

EMBODIMENT 2

Figure 17:
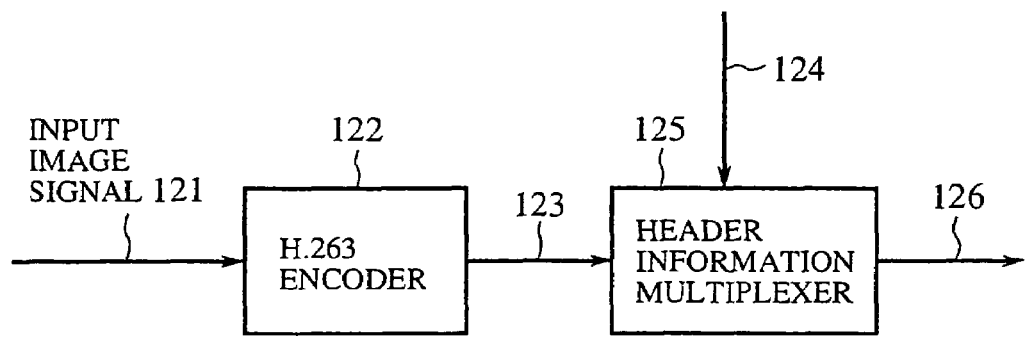
FIG. 17 is a block diagram showing a configuration of an image coding apparatus of embodiments 2 and 4 in accordance with the present invention.

FIG. 17 is a block diagram showing a configuration of an image coding apparatus in the embodiment 2, which generates a coded bit stream decodable by the image decoding apparatus described in the embodiment 1. In this figure, the reference numeral 121 designates an input image signal; 122 designates an H.263 encoder; 123 designates an H.263 coded bit stream; 124 designates an MPEG-4 compatible flag; 125 designates a header information multiplexer; and 126 designates an MPEG-4 compatible H.263 coded bit stream.

Next, the operation will be described.

First, the H.263 encoder 122 encodes the input image signal 121 according to the H.263 syntax, and generates the H.263 coded bit stream 123. Subsequently, the header information multiplexer 125, receiving the MPEG-4 compatible flag 124 indicative of generating the bit stream decodable by an MPEG-4 based decoder, multiplexes, before the picture header of the H.263 bit stream, the VO start code 231, VO identification number 232, VOL start code 233 and H.263 compatible identification information (a flag of "0" or "1" indicative of the H.263 based bit stream) 226, which are needed for implementing decoding by the image decoding apparatus as described in the embodiment 1. Thus, the contents of the MPEG-4 compatible H.263 coded bit stream 126 passing through the multiplexing become the bit stream as shown in FIG. 2(a) described in connection with the embodiment 1.

Figure 18:
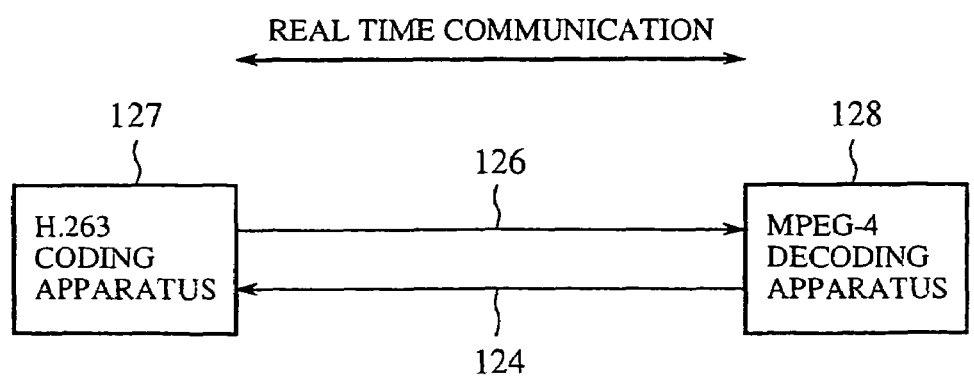
FIG. 18 is a diagram illustrating a relationship between an H.263 encoder and an MPEG-4 decoder in the embodiments 2 and 4 in accordance with the present invention.

When the H.263 coding apparatus 127 is carrying out real time communication with an MPEG-4 decoding apparatus 128 as shown in FIG. 18, the MPEG-4 decoding apparatus 128 can send the MPEG-4 compatible flag 124 to the H.263 coding apparatus 127, and in response to the reception of the MPEG-4 compatible flag 124, the H.263 coding apparatus 127 can multiplex into the H.263 bit stream 123 the VO start code 213, VO identification number 232, VOL start code 233 and H.263 compatible identification information 226, which are required for achieving decoding by the image decoding apparatus as described in the embodiment 1.

As described above, the present embodiment 2 multiplexes the VO start code 231, VO identification number 232, VOL start code 233 and H.263 compatible identification information 226 into the H.263 coded bit stream 123. This offers an advantage of being able to implement an image coding apparatus capable of generating a coded bit stream decodable by an MPEG-4 compatible image decoding apparatus.

EMBODIMENT 3

Figure 19:
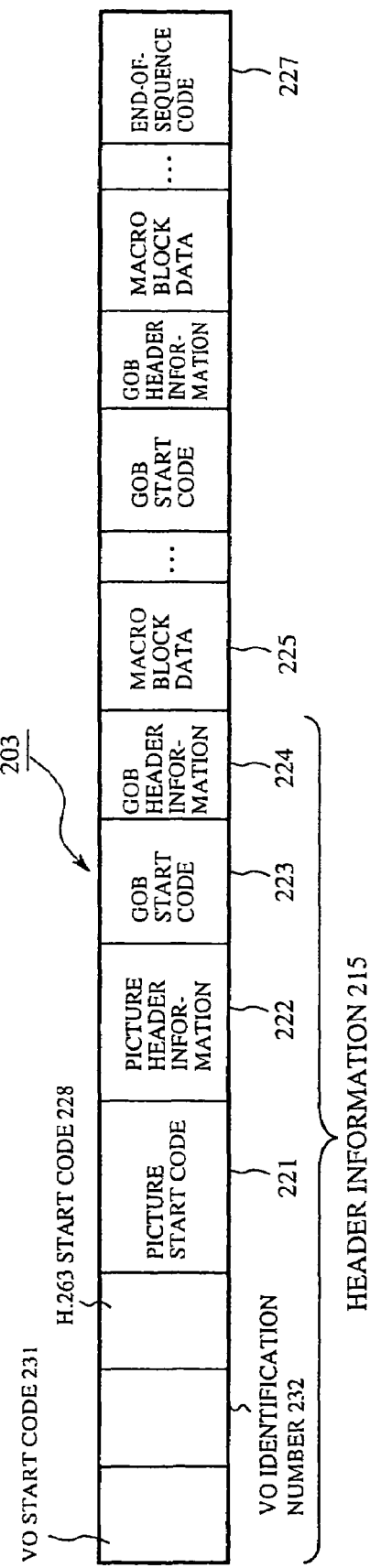
FIG. 19 is a diagram showing contents of an MPEG-4 compatible H.263 coded bit stream in an embodiment 3 in accordance with the present invention.

FIG. 19 is a diagram showing a structure of an MPEG-4 compatible H.263 coded bit stream 205 in the present embodiment 3. It includes in addition to the conventional H.263 coded bit stream 201 as shown in FIG. 1(a) a VO start code 231, a VO identification number 232 and an H.263 start code 228. The H.263 start code 228 has the functions of both the VOL start code 233 and H.263 compatible identification information 226 which are multiplexed in the embodiment 1.

The MPEG-4 coded bit stream 202 is identical to the conventional one as shown in FIG. 1(b).

Figure 20:
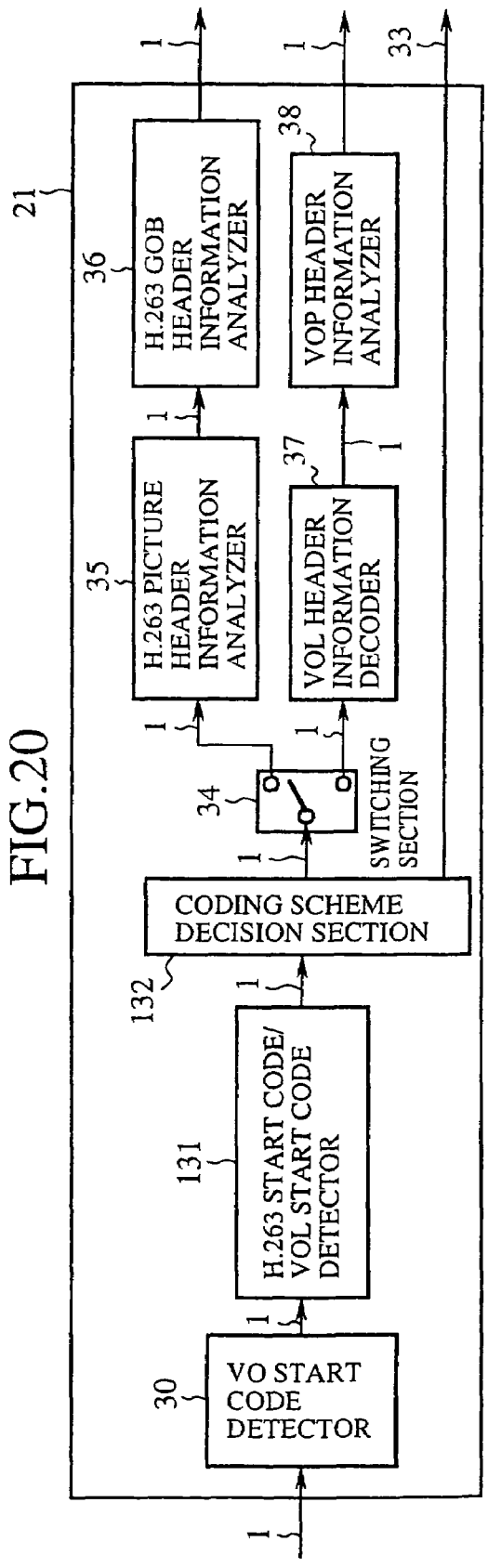
FIG. 20 is a block diagram showing a configuration of a header information analyzer in the embodiment 3 in accordance with the present invention.

The image decoding apparatus in the present embodiment differs from the image decoding apparatus described in the embodiment 1 only in the header information analyzer 21. FIG. 20 is a block diagram showing a configuration of the header information analyzer 21 in the embodiment 3. In this figure, the reference numeral 131 designates an H.263 start code/VOL start code detector; and 132 designates a coding scheme decision section. The VO start code detector 30, H.263 compatible identification information 33, switching section 34, H.263 picture header information analyzer 35, H.263 GOB header information analyzer 36, VOL header information decoder 37 and VOP header information analyzer 38 are the same as their counterparts as shown in FIG. 5 of the embodiment 1.

Next, the operation will be described.

In response to the detection of the VO start code 231 by the VO start code detector 30, the following decoding operation is started. First, as for the MPEG-4 compatible H.263 coded bit stream 205, the H.263 start code/VOL start code detector 131 detects the H.263 start code, while as for the MPEG-4 coded bit stream 202, it detects the VOL start code 233.

In the MPEG-4, the start code in each layer consists of a code (0000 0000 0000 0000 0000 0001) common to all the start codes, followed by a fixed length (5-bit) start code unique to the layer. The common start code is surely detected as the start code in the bit stream. Thus, the H.263 start code 228 also has a structure consisting of the common start code followed by the fixed length (5-bit) code enabling it to be identified as the H.263 coded bit stream.

When the start code detected is the H.263 start code 228, the coding scheme decision section 132 places the H.263 compatible identification information 33 at the H.263. In contrast, when the start code is the VOL start code 233, it places the H.263 compatible identification information 33 at the MPEG-4. The subsequent operation is the same as that of the embodiment 1.

As described above, the present embodiment 3 is configured such that it receives the MPEG-4 compatible H.263 coded bit stream 205 consisting of the H.263 coded bit stream 201 into which the VO start code 231, VO identification number 232 and H.263 start code 228 are multiplexed, and decodes these information items. This offers an advantage of being able to implement an image decoding apparatus having compatibility between the H.263 and MPEG-4.

EMBODIMENT 4

The present embodiment 4 is an image coding apparatus for generating a bit stream decodable by the image decoding apparatus described in the embodiment 3, and has the same configuration as that shown in FIG. 17 of the embodiment 2.

Next, the operation will be described.

First, the H.263 encoder 122 encodes the input image signal 121 according to the H.263 syntax, thereby generating the H.263 coded bit stream 123. Subsequently, receiving the MPEG-4 compatible flag 124, the header information multiplexer 125 multiplexes, before the picture header of the H.263 bit stream, the VO start code 231, VO identification number 232 and H.263 start code 228, which are needed for implementing decoding by the image decoding apparatus as described in the embodiment 3. Thus, the contents of the MPEG-4 compatible H.263 coded bit stream 126 passing through the multiplexing become equivalent to those of the bit stream as shown in FIG. 19 described in connection with the embodiment 3.

Incidentally, the MPEG-4 compatible flag 124 can be transferred from the MPEG-4 decoding apparatus 128 as described in connection with FIG. 18 of the embodiment 2.

As described above, the present embodiment 4 multiplexes the VO start code 231, VO identification number 232 and H.263 start code 228 into the H.263 bit stream 201. This offers an advantage of being able to implement an image coding apparatus capable of generating a coded bit stream decodable by the MPEG-4 compatible image decoding apparatus.

EMBODIMENT 5

Figure 21:
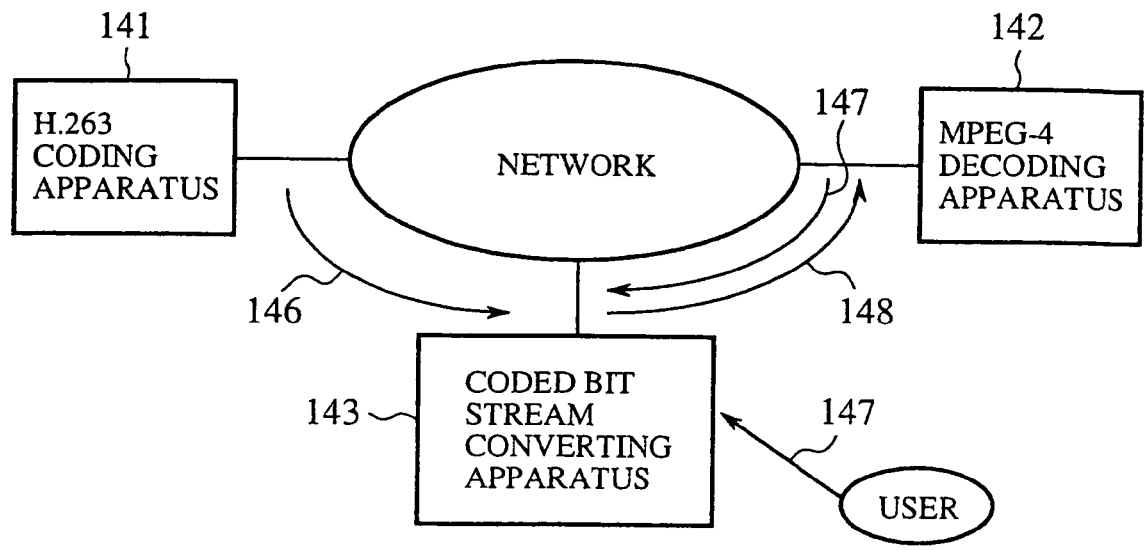
FIG. 21 is a diagram showing an image communications system of an embodiment 5 in accordance with the present invention.

The present embodiment 5 comprises a multiplexer for multiplexing the header information for implementing the MPEG-4 compatibility on a network, for example, independently of a coding apparatus. FIG. 21 is a diagram showing an image communications system in the present embodiment 5. In this figure, the reference numeral 141 designates an H.263 coding apparatus; 142 designates an MPEG-4 decoding apparatus; and 143 designates a coded bit stream converting apparatus. The H.263 coding apparatus 141, MPEG-4 decoding apparatus 142 and coded bit stream converting apparatus 143 are connected to a network.

Next, the operation will be described.

Receiving an MPEG-4 compatible flag 147 requesting for an MPEG-4 compatible H.263 coded bit stream 148 from the MPEG-4 decoding apparatus 142 or from a user, the coded bit stream converting apparatus 143 receives an H.263 coded bit stream 146 from the H.263 coding apparatus 141, multiplexes into the H.263 coded bit stream 146 the header information needed by the MPEG-4 decoding apparatus for carrying out decoding as described in the embodiment 2 or 4, and transmits the multiplexed data to the MPEG-4 decoding apparatus 142.

As described above, the present embodiment 5 comprises the coded bit stream converting apparatus 143 in the network. This offers an advantage of being able to implement an image communications system having compatibility between the H.263 and MPEG-4.

EMBODIMENT 6

Figure 22:
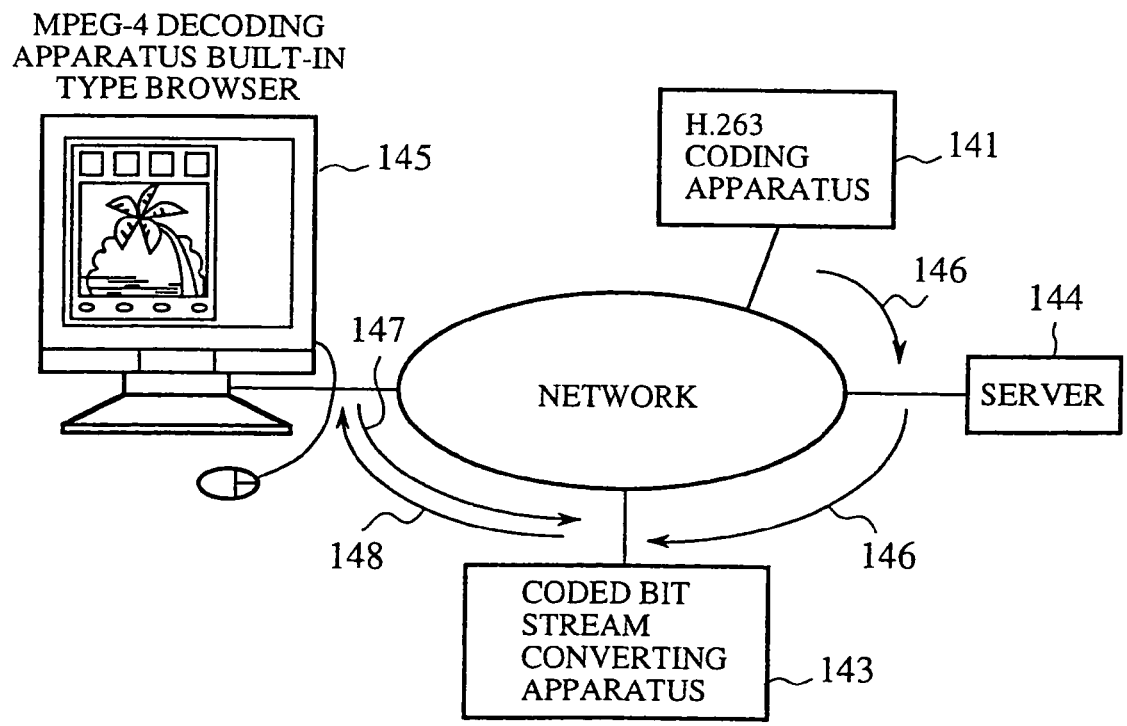
FIG. 22 is a diagram showing an image communications system of an embodiment 6 in accordance with the present invention.

FIG. 22 is a diagram showing an image communications system in the present embodiment 6. In this figure, the reference numeral 141 designates the H.263 coding apparatus; 143 designates the coded bit stream converting apparatus; 144 designates a server; and 145 designates an MPEG-4 decoding apparatus built-in type browser, which are connected to a network.

Next, the operation will be described.

When the MPEG-4 decoding apparatus built-in type browser 145 makes an access to the H.263 coded bit stream 146 transmitted on the network, it transmits to the server 144 the MPEG-4 compatible flag 147 indicative of decoding by the MPEG-4 decoding apparatus. Receiving the MPEG-4 compatible flag 147, the server 144 transmits the H.263 coded bit stream 146 to the coded bit stream converting apparatus 143.

The coded bit stream converting apparatus 143 generates the MPEG-4 compatible H.263 coded bit stream 148 decodable by the MPEG-4 decoding apparatus by adding header information to the received H.263 bit stream 146 as described in the embodiment 2 or 4, and transmits it to the MPEG-4 decoding apparatus built-in type browser 145. Receiving the MPEG-4 compatible H.263 coded bit stream 148, the MPEG-4 decoding apparatus built-in type browser 145 can decode the H.263 coded bit stream 146 to display images.

The MPEG-4 decoding apparatus built-in type browser 145 itself can also incorporates the coded bit stream converting apparatus 143. In this case, the MPEG-4 decoding apparatus built-in type browser 145 receives the H.263 coded bit stream 146 from the server 144, and converts the MPEG-4 compatible H.263 coded bit stream 148, so that the built-in MPEG-4 decoding apparatus can decode it to display images.

As described above, the present embodiment 6 comprises on the network the coded bit stream converting apparatus and the server. This offers an advantage of being able to implement an image communications system having compatibility between the H.263 and MPEG-4.

EMBODIMENT 7

The image decoding apparatuses as described in the foregoing embodiments 1 and 3 can distinguish the H.263 bit stream from the MPEG-4 bit stream. However, they cannot receive the H.263 bit stream as it is because the header information for making it MPEG-4 compatible must be multiplexed into the initial position of the H.263 bit stream generated by the H.263 coding apparatus. The embodiment 7 is an image decoding apparatus capable of receiving the H.263 bit stream without any change.

FIG. 23 is a block diagram showing a configuration of the header information analyzer 21 in the present embodiment 7. In this figure, the reference numeral 151 designates an H.263 picture start code detector for detecting an H.263 picture start code 221 multiplexed into the H.263 coded bit stream; 152 designates a coding scheme decision section; and 153 designates an H.263 picture header information analyzer for setting the VOL header information and VOP header information in response to the picture header information 222 multiplexed into the H.263 coded bit stream. The remaining VO start code detector 30, H.263 compatible identification information 33, switching section 34, H.263 GOB header information analyzer 36, VOL header information decoder 37 and VOP header information analyzer 38 correspond to those of the embodiment 1. The components other than the header information analyzer 21 are equivalent to those of the image decoding apparatus of the embodiment 1.

Next, the operation will be described.

Figures 24A, 24B:
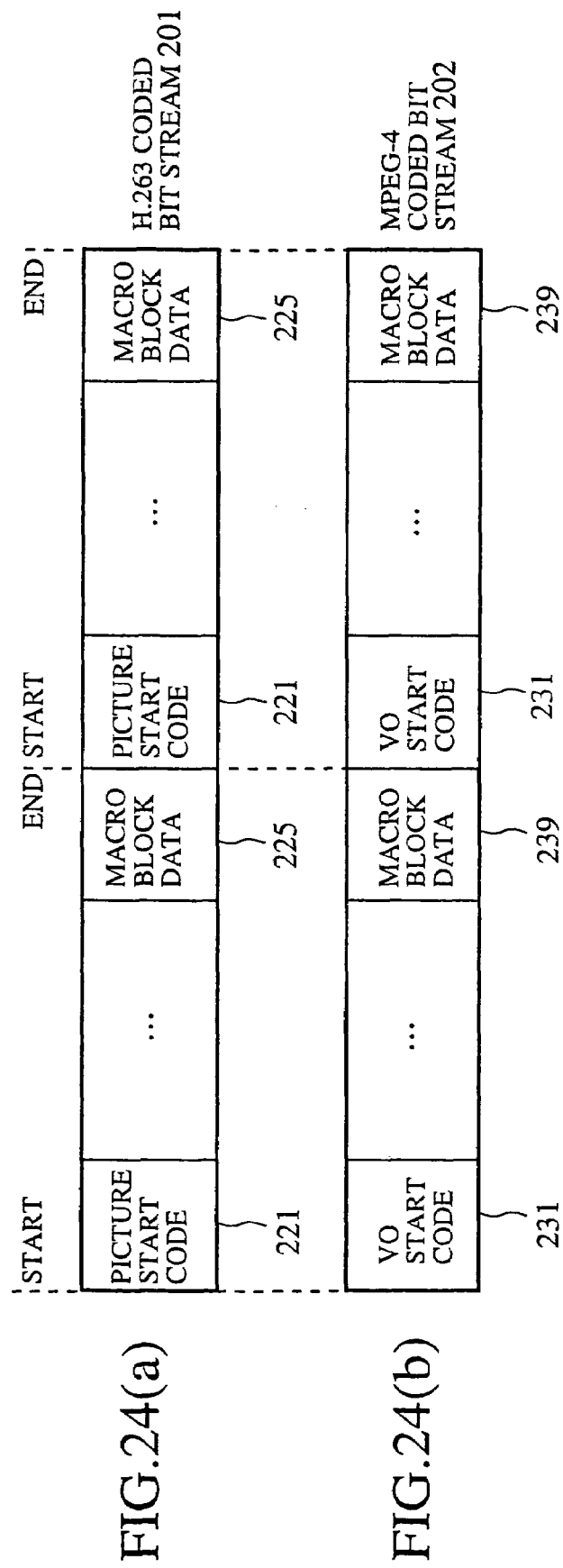
FIG. 24 is a diagram illustrating the start and end of a coded bit stream in the embodiment 7 in accordance with the present invention.

The H.263 picture start code detector 151 always monitors the start and end of the coded bit stream as shown in FIG. 24(*a*) and 24(*b*). It monitors, as a continuous coded bit stream, from the picture start code 221 to the macroblock data 225 as for the H.263 coded bit stream 201, while from the VO start code 231 to the macroblock data 239 with the MPEG-4 coded bit stream 202.

Receiving the H.263 coded bit stream 201, the H.263 picture start code detector 151 detects the picture start code 221, and supplies the result to the coding scheme decision section 152. The coding scheme decision section 152 makes a decision from the picture start code 221 that the received coded bit stream is the H.263 coded bit stream 201, and places the H.263 compatible identification information 33 at the H.263. In contrast, when the VO start code detector 30 detects the VO start code 231, the coding scheme decision section 152 makes a decision that the received coded bit stream is the MPEG-4 coded bit stream 202, and places the H.263 compatible identification information 33 at the MPEG-4.

As for the H.263 coded bit stream 201, the switching section 34 supplies it to the H.263 picture header information analyzer 153. The H.263 picture header information analyzer 153 decodes the picture header information 222 multiplexed into the H.263 coded bit stream 201, and sets the VOL header information and VOP header information as in the embodiment 1. The subsequent operation is the same as that of the embodiment 1.

On the other hand, as for the MPEG-4 coded bit stream 202, the switching section 34 supplies it to the VOL header information decoder 37. The subsequent operation is the same as that of the embodiment 1.

As described above, the present embodiment 7 decides that the bit stream is the H.263 coded bit stream 201 when detecting the picture start code 221, and sets the VOL header information and VOP header information. This offers an advantage of being able to implement an image decoding apparatus having compatibility between the H.263 and MPEG-4.

EMBODIMENT 8

The present embodiment 8 relates to a coded bit stream converting apparatus for converting the H.263 coded bit stream 201 as shown in FIG. 1(*a*) to the MPEG-4 coded bit stream 202 as shown in FIG. 1(*b*).

Figure 25:
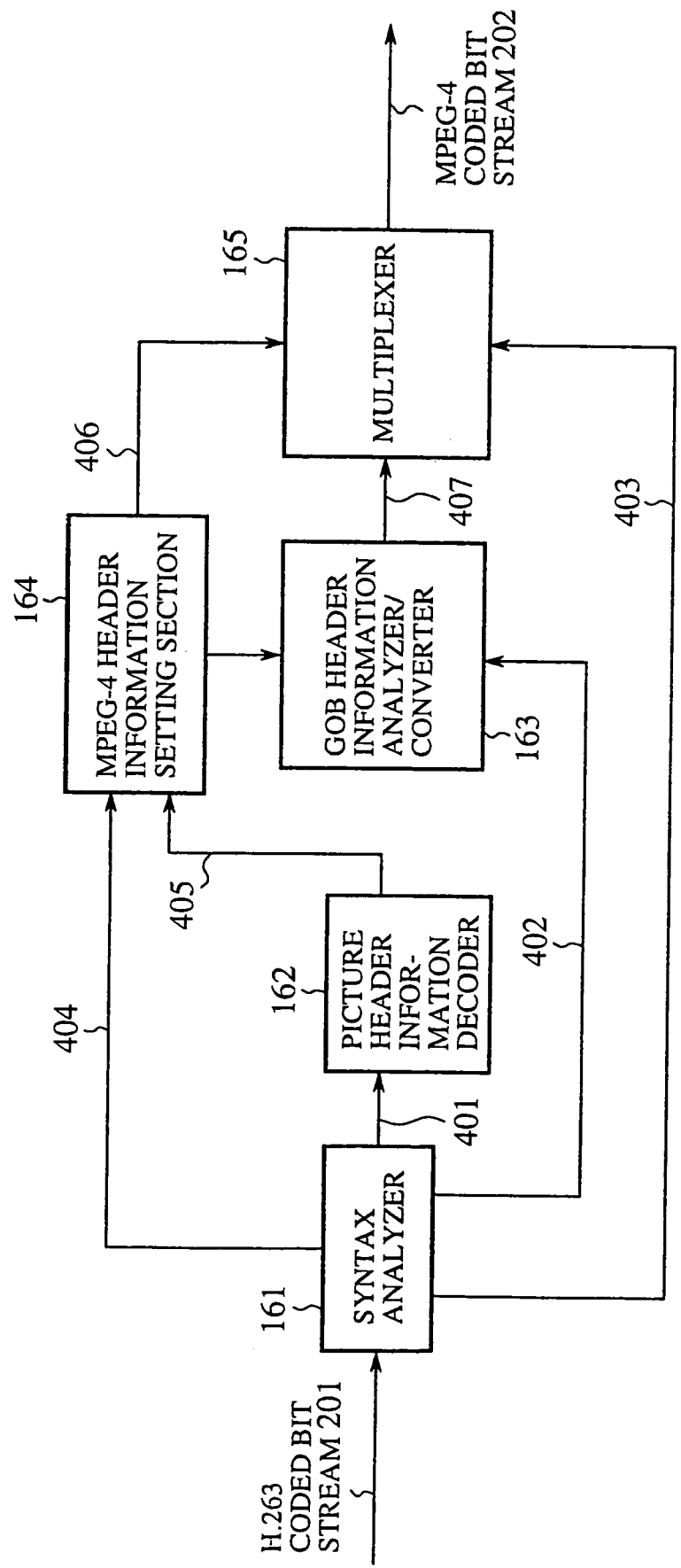
FIG. 25 is a block diagram showing a coded bit stream converting apparatus of an embodiment 8 in accordance with the present invention.

FIG. 25 is a block diagram showing the coded bit stream converting apparatus in the embodiment 8. In this figure, the reference numeral 161 designates a syntax analyzer for splitting the H.263 coded bit stream 201 into a picture header information code word 401, GOB header information code word 402 and macroblock data code word 403; 162 designates a picture header information decoder for decoding the picture header information code word 401; 163 designates a GOB header information analyzer/converter for decoding the GOB header information code word 402; 164 designates an MPEG-4 header information setting section for setting the VOL header information 234 and VOP header information 236; and 165 designates a multiplexer for producing the MPEG-4 coded bit stream 202.

Next, the operation will be described.

The syntax analyzer 161, detecting the picture start code 221 in the H.263 coded bit stream 201, splits the subsequent coded bit stream into the picture header information code word 401, GOB header information code word 402 and macroblock data code word 403, and supplies them to the picture header information decoder 162, GOB header information analyzer/converter 163 and multiplexer 165. The GOB header information code word 402 is not necessarily multiplexed into the H.263 coded bit stream 201, but is multiplexed as long as the GOB start code 223 is detected. When the GOB start code 223 is detected, GOB header detection information 404 is supplied to the MPEG-4 header information setting section 164. The picture header information decoder 162 decodes the picture header information code word 401 as in the embodiment 1, and supplies the MPEG-4 header information setting section 164 with picture header information 405 decoded.

In response to the decoded picture header information 405, the MPEG-4 header information setting section 164 sets the VOL header information 234 and VOP header information 236 as in the embodiment 1. As with the header information not referred to in the embodiment 1, any value disclosed in the ISO/IEC JTC1/SC29/WG11 MPEG-4 Video VM8.0 can be set. When the MPEG-4 header information setting section 164 receives the GOB header detection information 405, it enables the error resistant coding instruction mode.

As described in the embodiment 1, the decoding procedure of the macroblock data of the H.263 differs from that of the MPEG-4. Accordingly, the decoding side must change the decoding method in response to switching information. For this reason, the following switching information must be set in the VOL header.

(1) AC Coefficient VLC Table Switching Information.

Information for switching VLD tables used for carrying out the variable length decoding of the AC coefficient data on the decoding side, when the coding side uses different VLC tables for carrying out the variable length coding of the AC coefficient data as described in the embodiment 1.

(2) Esc Coding Switching Information.

Information for switching decoding schemes on the decoding side, when the coding side uses different coding schemes in the case where the AC coefficient data is not present in the VLC tables when carrying out the variable length coding of the AC coefficient data as described in the embodiment 1.

(3) Intra DC Coefficient Inverse Quantization Switching Information.

Information for switching the inverse quantization method of the DC coefficients, when the coding side employs different intra DC coefficient quantization methods as described in the embodiment 1.

The switching information items of the foregoing (1)-(3) can be integrally set as information for switching between the technique employed by the H.263 and other techniques.

The MPEG-4 header information set by the MPEG-4 header information setting section 164 undergoes the variable length coding, and is supplied to the multiplexer 165 as MPEG-4 header information code word 406.

The GOB header information analyzer/converter 163 decodes the GOB header information code word 402 as in the embodiment 1, and converts the GOB header information 224 into the resynchronization information 238 in the MPEG-4 representation form.

The MPEG-4 resynchronization information 238 is used as an error resistance reinforcer, and is multiplexed when the error resistant coding indication information of the VOL header information 236 is valid. When decoding the resynchronization information 238, the decoding side establishes the resynchronization with the coded bit stream, and resets the prediction vector and quantization step size used for decoding the macroblock. In the H.263, the prediction vector and the quantization step size are reestablished when the GOB header information 224 is decoded. Therefore, converting the GOB header information 224 using the resynchronization information 238 enables the GOB header information 224 to be converted into the MPEG-4 representation form.

FIG. 26 is a diagram showing a structure of the GOB header information 224 and the resynchronization information 238. A macroblock number 271 in the resynchronization information 238 is the number indicating the position of the macroblock in the VOP. It can be obtained by calculating the position of the macroblock corresponding to the received H.263 macroblock data in the picture. Since it corresponds to the first macroblock in the GOB, it can be calculated from the GOB number. A quantization scale 272 is obtained by setting the GOB quantization step size. A header expansion instruction code 273 is "1" when a time reference 274 and a VOP elapsed time 275 are to be multiplexed. These items of the information are used for representing the individual VOPs. The time reference 274 and the VOP elapsed time 275 can be set as needed when setting the header expansion instruction code 273 at "1". The resynchronization information 238 undergoes the variable length coding, so that the multiplexer 165 is supplied with a resynchronization information code word 407 that includes a resynchronization instruction code, that is, a fixed length unique code indicating that the resynchronization information 238 is multiplexed.

The multiplexer 165 multiplexes the MPEG-4 header information code word 406, resynchronization information code word 407 and macroblock data code word 403 into the coded bit stream, and supplies it to the MPEG-4 coded bit stream 202.

Although the resynchronization information is assumed to be multiplexed when the error resistant coding indication information of the VOL header information 234 is valid in the present embodiment, it can be multiplexed regardless of whether the error resistant coding indication information is valid or invalid.

The syntax analyzer 161 completes its analysis when it detects the end-of-sequence code 227 in the case where the end-of-sequence code 227 is added after the macroblock data 225 in the H.263 coded bit stream 201.

As described above, the present embodiment converts the H.263 coded bit stream 201 into the MPEG-4 coded bit stream 202. This offers an advantage of being able to decode the H.263 coded bit stream by the MPEG-4 image decoding apparatus.

EMBODIMENT 9

Although in FIG. 23 of the embodiment 7 when the H.263 picture start code detector 151 detects the picture start code 221, the coding scheme decision section 152 identifies the H.263 coded bit stream 201, and the H.263 picture header information analyzer 153 sets the VOL header information and VOP header information, the present embodiment switches the operation of the macroblock layer syntax analyzer 22 in response to the picture header information 222 decoded by the H.263 picture header information decoder 42 as shown in FIG. 6, which is included in the H.263 picture header information analyzer 153. This can obviate the MPEG-4 header information setting section 43. In addition, when the GOB start code detector 61 as shown in FIG. 8 of the embodiment 7 detects the GOB start code 223 in the H.263 coded bit stream 201, the GOB header information decoder 62 decodes the GOB header information 224, and the MPEG-4 header information update section 63 resets the VOP quantization step size included in the VOP header information 236. However, to decode the H.263 coded bit stream 201, it is enough for the present embodiment to reset the picture quantization step size 304 included in the picture header information 222 in order to decode the macroblock data using the picture header information 222.

Next, the operation of the macroblock layer syntax analyzer 22 will be described when decoding the macroblock data in response to the picture header information 222 decoded by the H.263 picture header information decoder 42.

Since the present embodiment differs in the operation of the switching sections 81, 83, 88 and 95, in the operation of the adder 94 and in the operation of the motion vector decoder 97 in the macroblock layer syntax analyzer as shown in FIG. 12, and differs in the operation of the switching section 102 in the block data decoder 98 as shown in FIG. 13, only the different portions will be described.

When the MPEG-4 coded bit stream 202 is decoded, that is, when the MPEG-4 is designated by the H.263 compatible identification information 33 that is set by the coding scheme decision section 152 as shown in FIG. 23, the switching section 81 is switched in response to the geometry information decoded by the VOL header information decoder 37. In contrast with this, when the H.263 coded bit stream 201 is decoded, that is, when the H.263 compatible identification information 33 indicates the H.263, the bit stream 1 is unconditionally supplied to the switching section 83 without passing through the geometry coded data decoder 82.

When the MPEG-4 coded bit stream 202 is decoded, the switching section 83 is switched in response to the VOP prediction type decoded by the VOP header information analyzer 38. On the other hand, when the H.263 coded bit stream 201 is decoded, the switching section 83 is switched in response to the picture coding type 302 decoded by the H.263 picture header information decoder 42. The switching operation itself is the same as that of the embodiment 1, and is carried out in response to whether the picture coding type 302 is intra or not.

When the MPEG-4 coded bit stream 202 is decoded, the switching section 88 is switched in response to the intra AC/DC prediction indication information decoded by the VOL header information decoder 37. When the H.263 coded bit stream 201 is decoded, that is, when the H.263 compatible identification information 33 indicates the H.263, the bit stream 1 is unconditionally supplied to the valid block identification information decoder 90 without passing through the AC prediction indication information decoder 89.

When the MPEG-4 coded bit stream 202 is decoded, the adder 94 adds to the decoded differential quantization step size 254 the VOP quantization step size of the first previous macroblock decoded, and outputs the sum as the quantization step size. In contrast with this, when the H.263 coded bit stream 201 is decoded, it adds to the decoded differential quantization step size 254, the picture quantization step size of the first previous macroblock decoded, and outputs the sum as the quantization step size.

When the MPEG-4 coded bit stream 202 is decoded, the switching section 95 is switched in response to the interlace mode indication information decoded by the VOP header information analyzer 38. When the H.263 coded bit stream 201 is decoded, that is, when the H.263 compatible identification information 33 indicates the H.263, the bit stream 1 is unconditionally supplied to the motion vector decoder 97 without passing through the interlace information decoder 96.

When the MPEG-4 coded bit stream 202 is decoded, the motion vector decoder 97 decodes the motion vector (texture motion data 7) in response to the motion vector search range designation information decoded by the VOP header information analyzer 38. When the H.263 bit stream is decoded, the motion vector decoder 97 decodes the motion vector (texture motion data 7) in response to the motion vector search range defined by the H.263.

When the MPEG-4 coded bit stream 202 is decoded, the switching section 102 in the block data decoder 98 is switched in response to the intra AC/DC prediction mode indication information decoded by the VOL header information decoder 37. When the H.263 coded bit stream 201 is decoded, that is, when the H.263 compatible identification information 33 indicates the H.263, the bit stream 1 is unconditionally supplied to the DC coefficient fixed length decoder 103. The subsequent operation is the same as that of the embodiment 1.

As described above, the embodiment 9 is configured such that it makes a decision that the bit stream is the H.263 coded bit stream 201 when it detects the picture start code 221, decodes the picture header information 222, and decodes the macroblock data in response to the picture header information 222 decoded. This offers an advantage of being able to implement the image coding apparatus having compatibility between the H.263 and MPEG-4 without setting the VOL header information and VOP header information.

INDUSTRIAL APPLICABILITY

As described above, the image decoding apparatus, image coding apparatus, image communications system and coded bit stream converting apparatus in accordance with the present invention can transmit and receive the coded bit stream of a different coding scheme in a simple configuration.

What is claimed is:

1. An image decoding apparatus for decoding at least a first coded bit stream into which header information of the H.263 coding scheme and image coded data encoded in the H.263 coding scheme are multiplexed, or for decoding a second coded bit stream into which header information of the MPEG-4 coding scheme and image coded data encoded in the MPEG-4 coding scheme are multiplexed, the image decoding apparatus comprising:
  a setter for setting image coded information to be used for decoding the received first coded bit stream according to a syntax of the second coded bit stream based on the image coded information included in the header information of the H.263 coding scheme; and
  a decoder for decoding image coded information included in the header information of the MPEG-4 coding scheme from the received second coded bit stream,
  wherein when the first coded bit stream is received, the received first coded bit stream is decoded according to the syntax of the second coded bit stream based on the image coded information set by the setter, and when the second coded bit stream is received, the received second coded bit stream is decoded according to the image coded information decoded by the decoder.

2. An image decoding method of decoding at least a first coded bit stream into which header information of the H.263 coding scheme and image coded data are encoded in the H.263 coding scheme are multiplexed, or for decoding a second coded bit stream into which header information of the MPEG-4 coding scheme and image coded data encoded in the MPEG-4 coding scheme are multiplexed, the image decoding method comprising the steps of:
  setting image coded information to be used for decoding the received first coded bit stream according to a syntax of the second coded bit stream based on the image coded information included in the header information of the H.263 coding scheme; and
  decoding image coded information included in the header information of the MPEG-4 coding scheme from the received second coded bit stream,
  wherein when the first coded bit stream is received, the received first coded bit stream is decoded according to the syntax of the second coded bit stream based on the image coded information set in the step of setting, and when the second coded bit stream is received, the received second coded bit stream is decoded according to the image coded information decoded in the step of decoding.

* * * * *